(12) United States Patent
Matsuzaki et al.

(10) Patent No.: US 7,984,489 B2
(45) Date of Patent: Jul. 19, 2011

(54) DEVICE REGISTRATION SYSTEM AND DEVICE REGISTRATION APPARATUS

(75) Inventors: Natsume Matsuzaki, Osaka (JP); Masaya Miyazaki, Osaka (JP); Yuichi Futa, Osaka (JP); Toshihisa Nakano, Osaka (JP); Hiroki Yamauchi, Osaka (JP); Soichiro Fujioka, Osaka (JP); Yuko Tsusaka, Osaka (JP)

(73) Assignee: Panasonic Corporation, Osaka (JP)

( * ) Notice: Subject to any disclaimer, the term of this patent is extended or adjusted under 35 U.S.C. 154(b) by 664 days.

(21) Appl. No.: 11/631,798

(22) PCT Filed: Jul. 14, 2005

(86) PCT No.: PCT/JP2005/013074
§ 371 (c)(1),
(2), (4) Date: Nov. 20, 2007

(87) PCT Pub. No.: WO2006/006678
PCT Pub. Date: Jan. 19, 2006

(65) Prior Publication Data
US 2008/0196109 A1    Aug. 14, 2008

(30) Foreign Application Priority Data
Jul. 15, 2004 (JP) .................................. 2004-208523

(51) Int. Cl.
*H04L 9/00* (2006.01)
(52) U.S. Cl. ................................ 726/6; 709/200; 726/29
(58) Field of Classification Search .................. 709/200; 726/29
See application file for complete search history.

(56) References Cited

U.S. PATENT DOCUMENTS

| 6,115,045 A | * | 9/2000 | Miyauchi | 345/418 |
|---|---|---|---|---|
| 6,341,316 B1 | * | 1/2002 | Kloba et al. | 709/248 |
| 2004/0015730 A1 | | 1/2004 | Arai et al. | |
| 2004/0093523 A1 | | 5/2004 | Matsuzaki et al. | |
| 2004/0162870 A1 | * | 8/2004 | Matsuzaki et al. | 709/200 |

FOREIGN PATENT DOCUMENTS

| JP | 11-203360 | 7/1999 |
|---|---|---|
| JP | 2002-269041 | 9/2002 |
| JP | 2003-60646 | 2/2003 |
| JP | 2004-005315 | 1/2004 |
| JP | 2004-120736 | 4/2004 |

OTHER PUBLICATIONS

"IBM Response to DVB-CPT Call for Proposals for Content Protection & Copy Management: xCP Cluster Protocol", <<http://www.almanden.ibm.com/software/ds/ContentAssurance/papers/xCP_DVB.pdf>>.

* cited by examiner

*Primary Examiner* — Vivek Srivastava
*Assistant Examiner* — Michael Anderson
(74) *Attorney, Agent, or Firm* — Wenderoth, Lind & Ponack, L.L.P.

(57) ABSTRACT

When a PC transmits a content request to a device registration apparatus in which a permitted number of devices have already been registered, an expiration time management unit judges whether any registration information registered in a registration list management unit has an exceeded registration expiration time. If registration information with an exceeded registration expiration time is registered in the registration list management unit, the registration list management unit deletes this registration information, and newly registers registration information of the PC.

25 Claims, 21 Drawing Sheets

FIG. 2
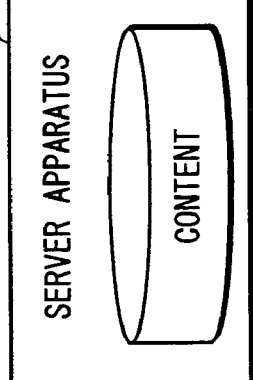
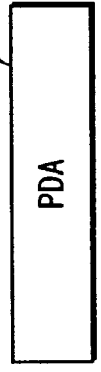
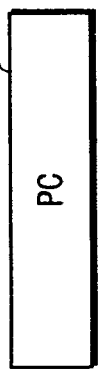

FIG. 4

300 REGISTRATION LIST

| DEVICE ID | EXPIRATION TIME | DELETION PROHIBITION TIME | |
|---|---|---|---|
| ID_0021 | 2005. 9. 10 | 2005. 12. 10 | 301 |
| ID_0022 | 2005. 7. 25 | 2005. 7. 25 | 302 |
| ID_0023 | 2005. 10. 1 | 2005. 8. 1 | 303 |
| ID_0024 | 2005. 3. 31 | 2005. 3. 31 | 304 |
| | | | |

FIG. 5

350 REGISTRATION LIST

| DEVICE ID | EXPIRATION TIME | DELETION PROHIBITION TIME | |
|---|---|---|---|
| ID_0021 | 2005. 9. 10 | 2005. 12. 10 | 351 |
| ID_0022 | 2005. 7. 25 | 2005. 7. 25 | 352 |
| ID_0023 | 2005. 10. 1 | 2005. 8. 1 | 353 |
| ID_0024 | 2005. 3. 31 | 2005. 3. 31 | 354 |
| ID_0123 | 2005. 12. 17 | 2005. 12. 17 | 355 |

FIG. 6

400 REGISTRATION RESERVATION LIST

| DEVICE ID | REGISTRATION RESERVATION TIME | |
|---|---|---|
| ID_0020 | 2005. 5. 5 | 401 |
| ID_0124 | 2005. 6. 6 | 402 |

FIG. 15

410 REGISTRATION LIST

| DEVICE ID | EXPIRATION TIME | DELETION RESERVATION FLAG | |
|---|---|---|---|
| ID_0021a | 2005. 9. 10 | 1 | 411 |
| ID_0022a | 2005. 7. 25 | 0 | 412 |
| ID_0023a | 2005. 10. 1 | 1 | 413 |
| ID_0024a | 2004. 3. 31 | 0 | 414 |
| ID_0020a | 2005. 6. 15 | 1 | 415 |

FIG. 16

450 DELETION RESERVATION LIST

| DEVICE ID | DELETION TIME | |
|---|---|---|
| ID_0020a | 2005. 6. 15 | 451 |
| ID_0021a | 2005. 9. 1 | 452 |
| ID_0023a | 2005. 10. 1 | 453 |

DEVICE REGISTRATION SYSTEM AND DEVICE REGISTRATION APPARATUS

BACKGROUND OF THE INVENTION

1 Technical Field

The present invention relates to techniques of forming and managing a group of devices that are allowed to copy and move digital content.

2 Background Art

In recent years, movies, music, games, and the like (hereafter referred to as "content") can easily be acquired via means such as an internet, digital broadcasting, and package media. In general, content is distributed in an encrypted form for copyright protection. The encrypted content can be decrypted and used only by an authorized device. However, excessively tight restrictions on the use of copyrighted works impair user friendliness.

In view of this, a system that allows free use of content within an "Authorized Domain" (hereafter "AD") such as a home is disclosed (e.g. non-patent document 3).

In this system, no more than a limited number of clients are registered in a home server, and the registered clients are allowed to freely use content held in the server.

Non-patent document 1: Tatsuaki Okamoto & Hiroshi Yamamoto, *Modern Cryptography*, pp. 155-156, Sangyo Tosho Non-patent document 2: American National Standards Institute, American National Standards for Financial Service, ANSX9.57: Public Key Cryptography For The Financial Industry: Certificate Management, 1997

Non-patent document 3: IIBM Response to DVIB-CPT Call for Proposals for Content Protection & Copy Management: xCP Cluster Protocol <URL: http://www.almanden.ibm.com/software/ds/ContentAssurance/papers/xCP_DVB-.pdf>

SUMMARY OF THE INVENTION

Disclosure Of The Invention

However, the above technique does not have sufficient usability, because a user needs to input a client ID and the like when registering a client to the server or deregistering a client from the server.

Hence the present invention aims to provide a device registration apparatus and a device registration system of high usability that can register and deregister a client without requiring a user to perform a troublesome operation.

The stated aim can be achieved by a device registration apparatus for registering a device as a member within a limitation on a permitted number of members, the device registration apparatus including: a clock unit operable to measure a time; a member storage unit operable to store registration information of each device already registered as a member, the registration information including identification information for identifying the registered device and a registration expiration time of the registered device; a selection unit operable to compare the time read from the clock unit with the registration expiration time included in the registration information of each registered device, and select registration information including a registration expiration time that is exceeded by the read time; and a-deletion unit operable to delete the selected registration information from the-member storage unit.

The device registration apparatus of the present invention manages the registration expiration time of each registered device, so that a registered device whose registration expiration time is exceeded can be deleted from an AD with there being no need for a user to perform an operation such as inputting a device ID.

Here, the device registration apparatus may further include: a reception unit operable to receive a registration request from a device, wherein when the reception unit receives the registration request, the selection unit compares the read time with the registration expiration time included in the registration information of each registered device, and selects the registration information including the exceeded registration expiration time.

According to this construction, the deletion operation by the device registration apparatus is triggered by the registration request from the device. Thus, the deletion operation is performed as the need arises on the part of the user. Also, the user need not be aware of the limitation on the number of registered devices, the number of registered devices, the registration expiration time of each registered device, and the like.

Here, the device registration apparatus may further include: a registration unit operable to generate registration information that includes identification information for identifying the device and a registration expiration time of the device, and write the generated registration information to the member storage unit.

According to this construction, the device registration apparatus deletes the registered device whose registration expiration time is exceeded from the AD and registers the device which makes the registration request to the AD, with there being no need for the user to perform a troublesome operation.

Here, the device registration apparatus may further include: a content storage unit operable to store content and a content ID for identifying the content, in correspondence with each other, wherein the registration request received by the reception unit from the device includes the content ID.

According to this construction, the deletion operation and the registration operation by the device registration apparatus are triggered by the registration request that is a request for content. Thus, the deletion operation and the registration operation can be performed when a content request arises on the part of the user.

Here, the registration unit may set a time at which a predetermined period elapses from the generation of the registration information, as the registration expiration time of the device.

According to this construction, the device registration apparatus can easily set the registration expiration time.

Here, the registration unit may set the registration expiration time of the device, according to a registration situation at a time of the generation of the registration information.

According to this construction, the device registration apparatus can flexibly set the registration expiration time depending on the registration situation at the time of registration.

Here, the registration situation may be a number of devices already registered as members at the time of the generation of the registration information.

According to this construction, when registering the device to the AD, the device registration apparatus sets, for example, two weeks for the registration expiration time of the device if four devices are already registered in the AD, and two months for the registration expiration time of the device if only one device is already registered in the AD. Thus, the registration expiration time can be set in consideration of the limitation on the number of registered devices.

Here, the device registration apparatus may further include: a deletion reservation unit operable to set a deletion reservation for registration information of a registered device that satisfies a predetermined condition, wherein the selection unit excludes, as an option for the selection, the registration information for which the deletion reservation is set.

According to this construction, if there is a device not to be deleted from the AD, the device registration apparatus prevents the deletion of the device from the AD by setting a deletion reservation for registration information of the device.

Here, the deletion reservation unit may store a deletion time corresponding to the registration information for which the deletion reservation is set, wherein the selection unit compares the time read from the clock unit with the deletion time in the deletion reservation unit, and includes, as the option for the selection, the registration information for which the deletion reservation is set if the deletion time is exceeded by the read time.

According to this construction, if there is a device not to be deleted from the AD, the device registration apparatus prevents the deletion of the device from the AD by setting a deletion reservation for registration information of the device. Also, by setting a deletion time at which the device becomes able to be deleted, the device registration apparatus deletes the device, which was prevented from deletion, at an appropriate time.

Here, the deletion reservation unit may determine whether to set the deletion reservation, according to the predetermined condition that relates to an attribute of the device.

According to this construction, the device registration apparatus determines whether to set the deletion reservation, depending on the attribute of the device such as whether the device is an online device or an offline device.

Here, the content storage unit may store a content expiration time of the content in correspondence with the content and the content ID, wherein the deletion reservation unit determines whether to set the deletion reservation, according to the predetermined condition that relates to the content expiration time corresponding to the content ID received by the reception unit.

According to this construction, the device registration apparatus prevents the deletion of the device from the AD until the content use expiration time of the content provided to the device is exceeded. Also, by setting the content use expiration time as the deletion time, the device registration apparatus deletes the device from the AD when the content use expiration time is exceeded.

Here, the device registration apparatus may further include: an authentication unit operable to authenticate whether the device is valid, wherein the registration unit generates the registration information and writes the generated registration information to the member storage unit, if the authentication unit authenticates the device as valid.

According to this construction, an unauthorized device is prevented from being registered to the AD, with it being possible to use the content securely.

Here, the authentication unit may store a list of information showing an invalidated device, and authenticate whether the device is valid based on the list and the registration request.

According to this construction, an unauthorized device shown in the revocation list is prevented from being registered to the AD, with it being possible to use the content securely.

Here, the device registration apparatus may further include: a registration reservation unit operable to hold a reservation list of reservation information showing an unregistered device, and register the unregistered device to the member storage unit if a predetermined condition is satisfied, wherein the selection unit instructs the registration reservation unit to make a registration reservation for the device, if no registration information in the member storage unit includes an exceeded registration expiration time, and the registration reservation unit generates reservation information of the device and writes the generated reservation information to the reservation list, when instructed by the selection unit.

According to this construction, the device registration apparatus enters a device which makes a registration request but cannot be registered yet, in the reservation list as a registration waiting device. In this way, devices can be registered to the AD in an order of registration request reception.

Here, the registration reservation unit may include: a judgment subunit operable to periodically compare the time read from the clock unit with the registration expiration time included in the registration information of each registered device, to judge whether a registration expiration time included in any registration information is exceeded by the read time; a deletion subunit operable to delete the registration information which is judged as including the exceeded registration expiration time by the judgment subunit; a registration subunit operable to generate registration information of the device and register the generated registration information to the member storage unit; and an abandonment subunit operable to abandon the reservation information of the device from the reservation list, when the registration subunit registers the registration information of the device.

According to this construction, if a registration waiting device is present in the reservation list, the device registration apparatus registers the registration waiting device to the AD once a device whose registration expiration time is exceeded has been deleted from the AD. In this way, devices can be registered in an order of registration request reception.

Here, the selection unit may periodically compare the time read from the clock unit with the registration expiration time included in the registration information of each registered device, and select the registration information including the exceeded registration expiration time.

According to this construction, the device registration apparatus can constantly avoid a situation where a device whose registration expiration time is exceeded remains in the AD, by periodically checking the clock and the registration expiration time. In this way, the device registration apparatus can promptly respond to a registration request from a new device.

Here, the reception unit may receive, from a registered device corresponding to the selected registration information, a deletion completion notification that the registered device has completed a member withdrawal process, wherein the deletion unit deletes the selected registration information when the reception unit receives the deletion completion notification.

According to this construction, the device registration apparatus confirms the completion of the deletion operation on the part of the device. As a result, any unauthorized act by the device can be suppressed.

Here, the device registration apparatus may further include: a device number control unit operable to store the limitation on the permitted number of members and a registered device number showing a number of devices already registered as members, and compare the registered device number with the limitation to exercise a control for registering the device without exceeding the limitation.

According to this construction, the device registration apparatus can constantly control device registration within the limitation on the number of registered devices, by managing the number of registered devices and its limitation.

Here, the device number control unit may decrement the registered device number when the deletion unit deletes registration information of one device from the member storage unit, and increment the registered device number when registration information of one device is written to the member storage unit.

According to this construction, the device registration apparatus can constantly control device registration within the limitation on the number of registered devices, by incrementing/decrementing the registered device number stored therein.

Here, the registration information of each registered device in the member storage unit may further include a deletion prohibition time of the registered device, wherein the selection unit further compares the time read from the clock unit with the deletion prohibition time included in the registration information of each registered device, and selects registration information including a registration expiration time and a deletion prohibition time that are both exceeded by the read time.

According to this construction, even though a registration expiration time of a device is exceeded, the device registration apparatus does not delete the device from the AD if a deletion prohibition time of the device is not exceeded. In the present system that suppresses unrestricted use of content by limiting the number of devices, this deletion prohibition time can be effectively used to prevent a situation where the suppression by the limitation on the number of devices becomes insufficient as a result of repeatedly performing device deletion and device registration in a short time.

BRIEF DESCRIPTION OF THE DRAWINGS

FIG. 2 shows an AD formed by the device registration system 1.

FIG. 4 shows a data structure of a registration list 300.

FIG. 5 shows a data structure of a registration list 350.

FIG. 6 shows a data structure of a registration reservation list 400.

FIG. 15 shows a data structure of a registration list 410.

FIG. 16 shows a data structure of a deletion reservation list 450.

FIG. 22 is a flowchart showing an operation of a deletion reservation unit 106a.

FIG. 23 is a flowchart showing an operation of the deletion reservation unit 106a.

DESCRIPTION OF REFERENCE NUMERALS

Figure 1:
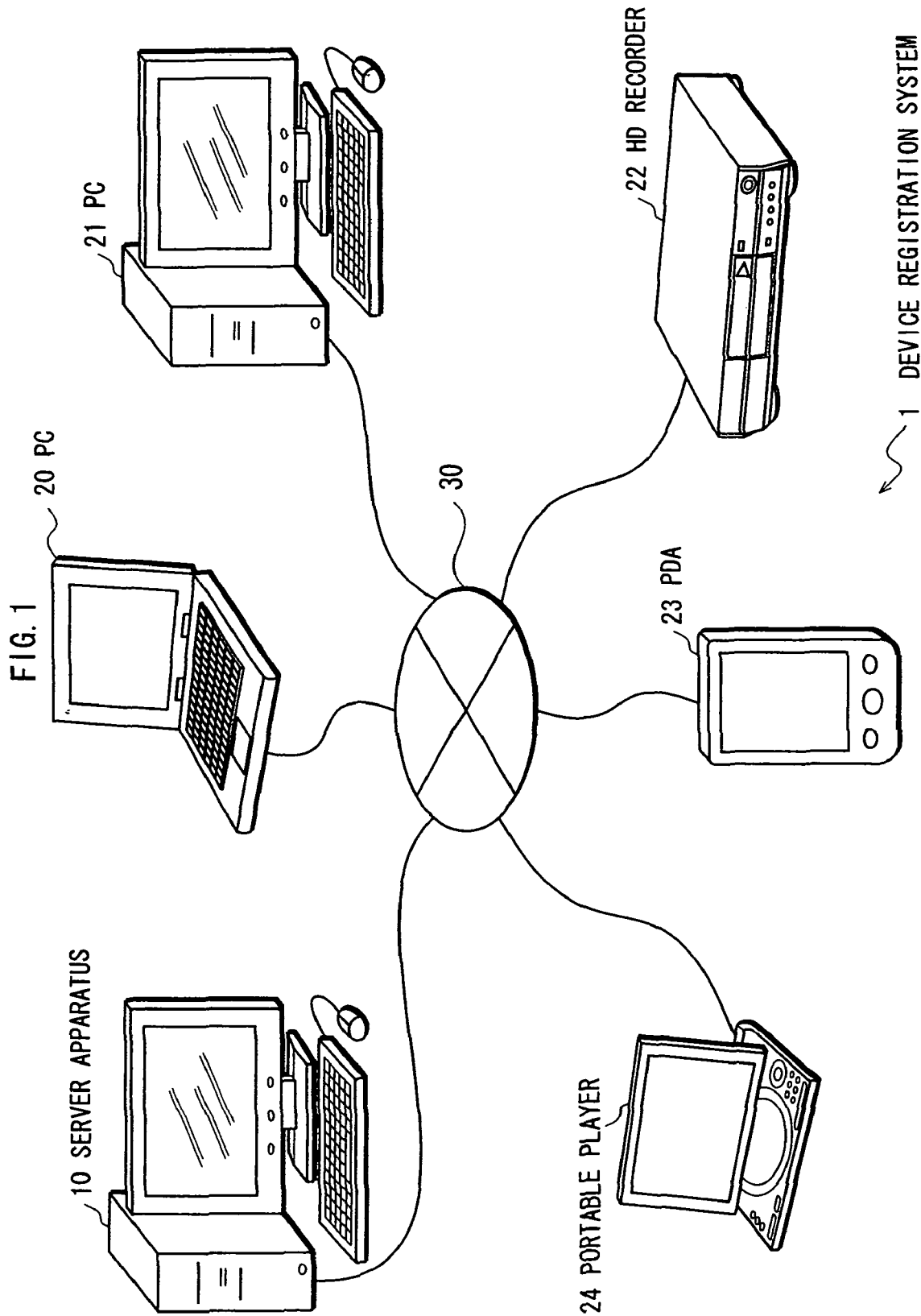
FIG. 1 shows a structure of a device registration system 1.

1 . . . device registration system
2 . . . device registration system
10 . . . server apparatus
10a . . . server apparatus
20 . . . PC
20a . . . PC
21 . . . PC
22 . . . HD recorder
23 . . . PDA
24 . . . portable player
25 . . . client
30 . . . network
101 . . . authentication unit
101a . . . authentication unit
102 . . . registration list management unit
102a . . . registration list management unit
103 . . . device number control unit
103a . . . device number control unit
104 . . . clock
104a . . . clock
105 . . . expiration time management unit
105a . . . expiration time management unit
106 . . . registration reservation unit
106a . . . deletion reservation unit
107 . . . content storage unit
107a . . . content storage unit
108 . . . content distribution unit
108a . . . content distribution unit
109 . . . input/output unit
109a . . . input/output unit
201 . . . authentication unit
201a . . . authentication unit
202 . . . device ID storage unit
202a . . . device ID storage unit
203 . . . request generation unit
203a . . . request generation unit
204 . . . input unit
204a . . . input unit
205 . . . display unit
205a . . . display unit
206 . . . storage unit
206a . . . storage unit
207 . . . input/output unit
207a . . . input/output unit

DETAILED DESCRIPTION OF THE INVENTION

First Embodiment

The following describes a device registration system 1 as a first embodiment of the present invention.

The device registration system 1 forms an AD by registering a plurality of clients in a server apparatus in a home of a user, and allows free use of content within the AD. Here, the term "use" means to copy content to a storage area of a client and play back the copied content in the client.

<Structure>

1. Overall System

The following describes a structure of the device registration system 1 and the AD.

As shown in FIG. 1, the device registration system 1 is roughly made up of a server apparatus 10, a PC (Personal Computer) 20, a PC 21, an HD (Hard Disc) recorder 22, a PDA (Personal Digital Assistant) 23, and a portable player 24. These devices can be connected to each other via a network 30.

In this embodiment, each of the PC 20, the PC 21, the HD recorder 22, the PDA 23, and the portable player 24 is also referred to as simply a "client".

The terms "server" and "client" are originally names of functions. Accordingly, one device may-have both a server function and a client function.

In this embodiment, however, a device having a server function of providing content within one AD is called a server apparatus (this server apparatus may have a client function in another AD), while a device having a client function of using content held in the server apparatus is called a client (this client may have a server function or a client function in another AD).

Also, a client may be any of an online device and an offline device in the present invention. An online device is installed in the home of the user, and is constantly connected to the network 30. For example, the PC 21 and the HD recorder 22 are online devices. An offline device need not be constantly connected to the network 30, and can be brought outside the home. For example, the PC 20, the PDA 23, and the portable player 24 are offline devices.

The AD formed by the device registration system 1 is described next, with reference to FIG. 2.

In this embodiment, a limitation on a permitted number of devices registered in the AD formed by the server apparatus 10 is five. This device number limitation of the AD has been determined beforehand.

In FIG. 2, the AD is a range encircled by a solid line. As can be seen from the drawing, the PC 21, the HD recorder 22, the PDA 23, and the portable player 24 are already registered in the server apparatus 10. These clients registered in the server apparatus 10 are allowed to use content held in the server apparatus 10.

In the state shown in FIG. 2, the four clients are already registered in the server apparatus 10, leaving a room for one more client to register. This being the case, the PC 20 which is the 5th client is registrable, and can use the content held in the server apparatus 10 once registered. On the other hand, a client 25 which is the 6th client is unregistrable, since the device number limitation is exceeded.

2. Server Apparatus 10

Figure 3:
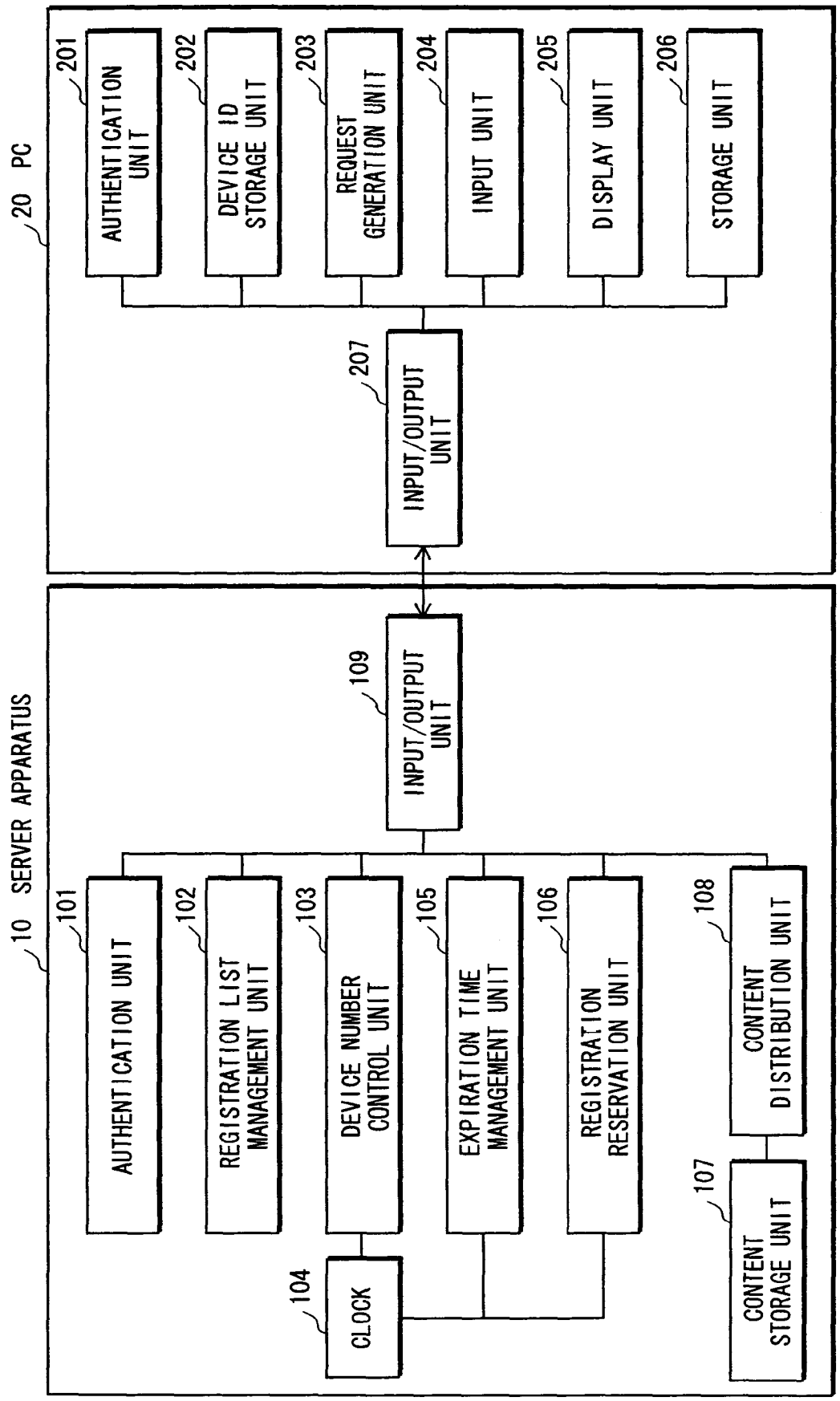
FIG. 3 is a functional block diagram showing functional structures of a server apparatus 10 and a PC 20.

The server apparatus 10 includes an authentication unit 101, a registration list management unit 102, a device number control unit 103, a clock 104, an expiration time management unit 105, a registration reservation unit 106, a content storage unit 107, a content distribution unit 108, and an input/output unit 109, as shown in FIG. 3.

The server apparatus 10 is actually constituted by a microprocessor, a ROM, a RAM, a hard disk unit, and the like. Operations of the server apparatus 10 such as registration, deletion (deregistration), and content distribution can be realized by the microprocessor executing a computer program.

(1) Authentication Unit 101

The authentication unit 101 has an internal storage area in which a public key certificate Cert_0010, a CRL (Certificate Revocation List), and a secret key SK_0010 are stored. Cert_0010 and the CRL are data which the server apparatus 10 has acquired from a certificate authority (CA) beforehand.

Cert_0010 contains a device ID (ID_0010) of the server apparatus 10, a public key (PK_0010) of the server apparatus 10, and signature data (Sig_0010CA). PK_0010 is a public key corresponding to the secret key SK_0010. The signature data (Sig_0010CA) is a digital signature made by the certificate authority (CA) on the device ID (ID_0010) and the public key (PK_0010).

The CRL is a list of information showing each public key certificate which has been revoked as a result of, for example, revelation of a secret key. The secret key SK_0010 is key data unique to the server apparatus 10, and is stored in a secure area in the authentication unit 101.

Upon receiving a content request or a deletion request from a client via the input/output unit 109, the authentication unit 101 performs an authentication and session key sharing operation with the client that issues the content request or the deletion request. The authentication and session key sharing operation will be described in detail later.

The content request referred to here is information transmitted from a client registered or unregistered in the AD to the server apparatus 10 to request provision of content, and includes a content ID for identifying the content, a device ID for identifying the client, a public key certificate Cert_L of the client, and the like. The deletion request is information transmitted from a client registered in the AD to the server apparatus 10 to request withdrawal from the AD.

Note here that the CRL is not an essential feature of the present invention. Accordingly, the authentication unit 101 may be constructed to authenticate a client without using the CRL.

(2) Registration List Management Unit 102

The registration list management unit 102 stores a registration list that lists the members of the AD.

FIG. 4 shows a data structure of a registration list 300 as a specific example of the registration list. As shown in the drawing, the registration list 300 includes registration information 301, 302, 303, and 304. Each piece of registration information contains a device ID, an expiration time, and a deletion prohibition time. Since the AD has the 5-device limitation, one more client is registrable to the registration list 300.

The device ID is a value or a symbol for uniquely identifying a client. In this embodiment, device IDs of the PC 21, the HD recorder 22, the PDA 23, and the portable player 24 are respectively ID_0021, ID_0022, ID_0023, and ID_0024.

The expiration time indicates an end of a period during which the client is a member of the AD. In the example of FIG. 4, an expiration time of the PC 21 is Sep. 10, 2005, an expiration time of the HD recorder 22 is Jul. 25, 2005, an expiration time of the PDA 23 is Oct. 1, 2005, and an expiration time of the portable player 24 is Mar. 31, 2005. The client is the member of the AD and can acquire content from the server apparatus 10, during the period from when the registration information of the client is registered in the registration list to the expiration time. In this embodiment, a method of setting the expiration time is predetermined according to the system. In detail, the server apparatus 10 sets a date that is a predetermined period (e.g. one month) after the client is registered in the AD, as the expiration time.

The deletion prohibition time indicates an end of a period during which the complete deletion of the client from the AD is prohibited. In more detail, the deletion prohibition time indicates an end of a period during which the device number control unit 103 is prohibited from decrementing the number of registered devices. In the example of FIG. 4, a deletion prohibition time of the PC 21 is Dec. 10, 2005, a deletion prohibition time of the HD recorder 22 is Jul. 25, 2005, a deletion prohibition time of the PDA 23 is Aug. 1, 2005, and a deletion prohibition time of the portable player 24 is Mar. 31, 2005.

It should be noted here that the deletion prohibition time is set independently of the expiration time.

By setting the deletion prohibition time, even when an expiration time of a device is exceeded, the server apparatus 10 prevents the deletion of the device from the AD if a deletion prohibition time of the device is not exceeded. Thus, in the present system that suppresses unrestricted use of content by limiting the number of devices, the deletion prohibition time is used to prevent a situation where the suppression by the limitation on the number of devices becomes insufficient as a result of repeatedly performing device deletion and device registration in a short time.

In this embodiment, a method of setting the deletion prohibition time may be determined according to the system beforehand, determined according to a specification of a provider that provides content to the server apparatus 10, or determined depending on a service fee paid by the user.

The registration list management unit 102 updates the registration list, by generating registration information and writing the generated registration information to the registration list, or by deleting registration information from the registration list in response to an instruction from the expiration time management unit 105.

Also, when instructed by the expiration time management unit 105, the registration list management unit 102 changes an expiration time of a client for which a deletion request is received before the expiration time, to a date at which the deletion request is received. For instance, when receiving a deletion request from the PC 21 (ID_0021) on Aug. 1, 2005 in a state where the registration list management unit 102 stores the registration list 300 shown in FIG. 4, the registration list management unit 102 rewrites the expiration time in the registration information 301 from Sep. 10, 2005 to Aug. 1, 2005.

(3) Device Number Control Unit 103

The device number control unit 103 stores the device number limitation of the AD beforehand. In this embodiment, the device number limitation of the AD is five. Accordingly, the device number control unit 103 stores "5" as the device number limitation of the AD. This device number limitation is stored in a secure area that is externally unrewritable.

Also, the device number control unit 103 manages the number of registered devices, i.e. the number of clients registered in the AD, and increments/decrements the number of registered devices-within the device number limitation.

A relationship between the number of registered devices managed by the device number control unit 103 and the deletion prohibition time is explained in detail below, using the registration list 300 as an example.

The expiration time of the registration information 301 is Sep. 10, 2005. Accordingly, the PC 21 becomes unable to use content in the server apparatus 10 after Sep. 10, 2005. However, the device number control unit 103 cannot decrement the number of registered devices, until after Dec. 10, 2005 which is the deletion prohibition time of the registration information 301. In the case where the server apparatus 10 receives a deletion request from the PC 21 before Sep. 10, 2005, too, the device number control unit 103 cannot decrement the number of registered devices until after Dec. 10, 2005.

The expiration time and the deletion prohibition time of the registration information 302 are both Jul. 25, 2005. Accordingly, the HD recorder 22 becomes unable to use content in the server apparatus 10 after Jul. 25, 2005, and the device number control unit 103 decrements the number of registered devices once Jul. 25, 2005 has passed. Meanwhile, if the server apparatus 10 receives a deletion request from the HD recorder 22 before Jul. 25, 2005, the device number control unit 103 cannot decrement the number of registered devices until after Jul. 25, 2005.

The expiration time of the registration information 303 is Oct. 1, 2005. Accordingly, the PDA 23 becomes unable to use content in the server apparatus 10 after Oct. 1, 2005. At this time, the deletion prohibition time (Aug. 1, 2005) is already exceeded, so that the device number control unit 103 can decrement the number of registered devices. Meanwhile, if the server apparatus 10 receives a deletion request from the PDA 23 before Aug. 1, 2005, the device number control unit 103 cannot decrement the number of registered devices until after Aug. 1, 2005.

The expiration time and the deletion prohibition time of the registration information 304 are both Mar. 31, 2005. Accordingly, the portable player 24 becomes unable to use content in the server apparatus 10 after Mar. 31, 2005, and the device number control unit 103 decrements the number of registered devices after Mar. 31, 2005. Meanwhile, if the server apparatus 10 receives a deletion request from the portable player 24 before Mar. 31, 2005, the device number control unit 103 cannot decrement the number of registered devices until after Mar. 31, 2005.

Though the device number control unit 103 is constructed to store the number of registered devices and the device number limitation in this embodiment, this is not a limit for the present invention. For example, the device number control unit 103 may store a number of further registrable devices (i.e. how many more devices can be registered).

(4) Clock 104

The clock 104 measures a time. In more detail, the clock 104 measures a current date and time. The time measured by the clock 104 here is securely managed so as not to be externally rewritten or stopped by unauthorized means.

It should be noted here that the clock 104 is not limited to the construction of measuring the current date and time (absolute time). The clock 104 can be realized by other constructions such as a timer for measuring a time based on an initial value or a counter for counting "1" per predetermined time, so long as the time measured by the clock 104 is information that can be used for judging whether an expiration time and a deletion prohibition time in registration information are exceeded or not. Also, an accuracy of the clock 104 may be any of dates, hours, minutes, and the like, so long as the time measured by the clock 104 can be used for judging whether an expiration time and a deletion prohibition time in registration information are exceeded or not.

(5) Expiration Time Management Unit 105

The expiration time management unit 105 compares, when the server apparatus 10 receives a content request from an unregistered client and the registration list in the registration list management unit 102 already contains five pieces of registration information as shown in a registration list 350 of FIG. 5, the expiration time included in each piece of registration information and the current date and time measured by the clock 104 to judge whether an expiration time of any client is exceeded.

Suppose the current date and time acquired by the expiration time management unit 105 from the clock 104 is Jun. 1, 2005. Since an expiration time of registration information 354 is Mar. 31, 2005, the expiration time management unit 105 judges that the expiration time of the portable player 24 (ID__0024) is already exceeded. Also, when the server apparatus 10 receives a deletion request from a registered client, the expiration time management unit 105 compares an expiration time and a deletion prohibition time included in registration information of that client with the current date and time, to judge whether the device number control unit 103 can decrement the number of registered devices. Furthermore, the expiration time management unit 105 outputs an instruction to rewrite the expiration time of the client to the current date and time read from the clock 104, to the registration list management unit 102.

(6) Registration Reservation Unit 106

The registration reservation unit 106 generates, when the server apparatus 10 receives a content request from a new client in a state where the five clients are already registered as the members of the AD, registration reservation information of the client as a "registration waiting client", and registers the generated registration reservation information to a registration reservation list. FIG. 6 shows a data structure of a registration reservation list 400 as one example of the registration reservation list.

Suppose the server apparatus 10 receives a content request from the PC 20 on May 5, 2005, in a state where the registration list management unit 102 stores the registration list 350 shown in FIG. 5 and the number of registered devices managed by the device number control unit 103 is five. The registration reservation unit 106 generates registration reservation information 401 that is composed of the device ID (ID__0020) of the PC 20 and the date at which the content request is received (hereafter "registration reservation time") (May 5, 2005), and registers the registration reservation information 401 to the registration reservation list.

Likewise, when the server apparatus 10 receives a content request from a client (not illustrated) having a device ID ID__0124 on Jun. 6, 2005, the registration reservation unit 106 generates registration reservation information 402 that is composed of the device ID (ID__0124) of the client and the registration reservation time (Jun. 6, 2005), and registers the registration reservation information 402 to the registration reservation list.

Furthermore, the registration reservation unit 106 monitors the registration reservation list, the registration list, and the number of registered devices. When a registered client is deleted from the AD, the registration reservation unit 106 registers a client shown in the registration reservation list to the AD. If a plurality of clients are listed in the registration reservation list, the registration reservation unit 106 registers a client having an earliest registration reservation time to the AD first.

(7) Content Storage Unit 107

The content storage unit 107 is actually constituted by a hard disk unit and stores content. This content may be acquired from an external content server or read from a portable medium such as an optical disc.

The content storage unit 107 stores the content and a content ID in correspondence with each other. The content ID is identification information for uniquely identifying the content. Upon receiving a content ID from the content distribution unit 108, the content storage unit 107 reads content identified by the received content ID, and outputs the read content to the content distribution unit 108.

(8) Content Distribution Unit 108

The content distribution unit 108 outputs the content ID to the content storage unit 107, and receives the corresponding content.

The content distribution unit 108 encrypts the content using a session key shared with a client by the authentication unit 101 as an encryption key, to generate encrypted content. The content distribution unit 108 transmits the encrypted content to the client via the network 30.

(9) Input/output Unit 109

The input/output unit 109 is a network connecting unit, and communicates with each client via the network 30.

3. Structure of the PC 20

The PC 20 includes an authentication unit 201, a device ID storage unit 202, a request generation unit 203, an input unit 204, a display unit 205, a storage unit 206, and an input/output unit 207, as shown in FIG. 3.

The PC 20 is actually a computer system that is constituted by a microprocessor, a ROM, a RAM, a hard disk unit, a network connecting unit, a display, a keyboard, a mouse, and the like.

(1) Authentication Unit 201

The authentication unit 201 has an internal storage area in which a public key certificate Cert__0020, a CRL, and a secret key SK__0020 are stored. Cert__0020 and the CRL are data which the PC 20 has acquired from the certificate authority (CA) in advance.

Cert__0020 includes the device ID (ID__0020) of the PC 20, a public key (PK__0020) of the PC 20, and signature data (Sig__0020CA). PK__0020 is a public key corresponding to the secret key SK__0020. The signature data (Sig__0020CA) is a digital signature made by the certificate authority (CA) on the device ID (ID__0020) and the public key (PK__0020).

The CRL is a list of information showing each public key certificate which has been revoked as a result of, for example, revelation of a secret key. The secret key SK__0020 is key data unique to the PC 20, and is stored in a secure area in the authentication unit 201.

After transmitting a content request or a deletion request to the server apparatus 10, the authentication unit 201 performs the authentication and session key sharing operation with the server apparatus 10.

Note here that the CRL is not an essential feature of the present invention. Accordingly, the authentication unit 201 may be constructed to authenticate a client without using the CRL.

(2) Device ID Storage Unit 202

The device ID storage unit 202 stores the device ID (ID__0020) for uniquely identifying the PC 20.

(3) Request Generation Unit 203

The request generation unit 203 generates a content request, upon receiving selection of content via the input unit 204.

Also, when instructing to withdraw from the AD via the input unit 204, the request generation unit 203 generates a deletion request. The request generation unit 203 then generates a deletion completion notification in a deletion operation with the server apparatus 10. The deletion request is a request made to the server apparatus 10 to withdraw from the AD.

Suppose the user bought a new device and wants to register the new device to the AD immediately, but the new device cannot be registered because the number of clients registered in the AD is equal to the device number limitation. In such a case, the deletion request can be used effectively.

Which is to say, the user can delete a rarely used device from the AD before an expiration time of that device, and register the new device once the number of registered devices has been decremented to enable registration of one more device.

(4) Input Unit 204

The input unit 204 is actually provided with a keyboard, a mouse, and the like, and receives an input when the user operates the keyboard and/or the mouse.

As a specific example, when content is selected by a click of the mouse in a state where a content list, i.e. a list of content held in the server apparatus 10, is displayed by the display unit 205, the input unit 204 outputs a content ID corresponding to the selected content to the request generation unit 203.

(5) Display Unit 205

The display unit 205 is provided with a display, and displays the content list, content, and the like on the display.

(6) Storage Unit 206

The storage unit 206 stores the content list, i.e. the list of content held in the server apparatus 10. As one example, the content list has been transmitted from the server apparatus 10 to the PC 20 by an UPnP protocol beforehand. Also, the storage unit 206 stores content received from the server apparatus 10.

(7) Input/Output Unit 207

The input/output unit 207 is a network connecting unit, and communicates with the server apparatus 10 via the network 30.

Though the structure of the PC 20 has been described here as an example client, the other clients have the same functional structure as the above PC 20 except for the stored device ID and public key certificate.

<Operations>

Operations of the device registration system 1 are described below, using flowcharts shown in FIGS. 7 to 13.

1. Overall Operation of the System

Figure 7:
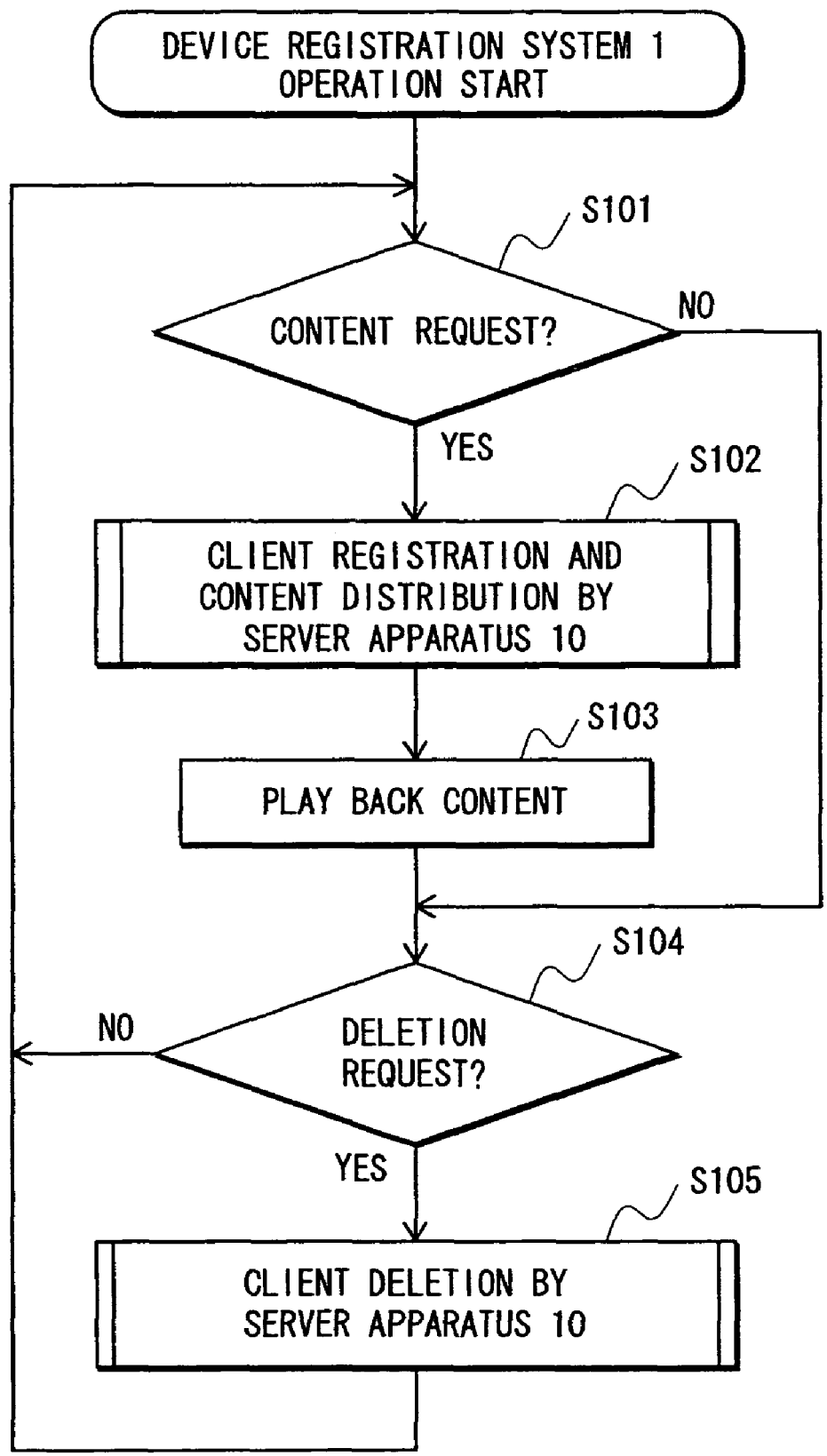
FIG. 7 is a flowchart showing an overall operation of the device registration system 1.

FIG. 7 is a flowchart showing an overall operation of the device registration system 1.

When there is no content request (step S101: NO) and no deletion request (step S104: NO) from any client, the device registration system 1 returns to step S101 without performing any process.

When a content request is issued from a client (step S101: YES), the device registration system 1 performs an operation of registering the client and distributing content to the client by the server apparatus 10 (step S102). The client plays back the content acquired from the server apparatus 10 (step S103). After this, the operation proceeds to step S104.

When a deletion request is issued from a client (step S104: YES), the device registration system 1 performs an operation of deleting the client by the server apparatus 10 (step S105). After this, the operation returns to step S101.

2. Registration and Content Distribution Operation

Figure 8:
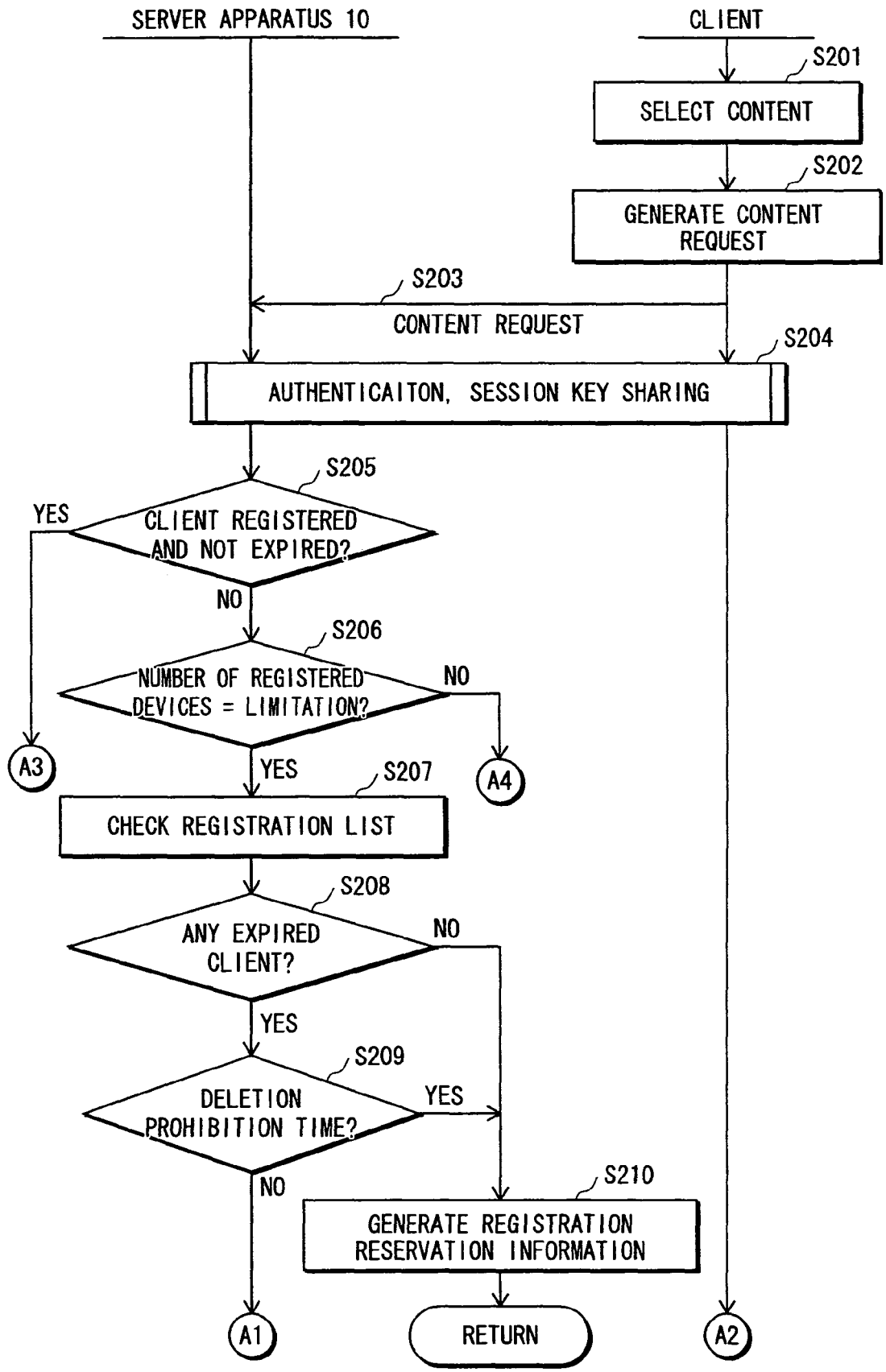
FIG. 8 is a flowchart showing a registration and content distribution operation in the device registration system 1, continuing to FIG. 9.
Figure 9:
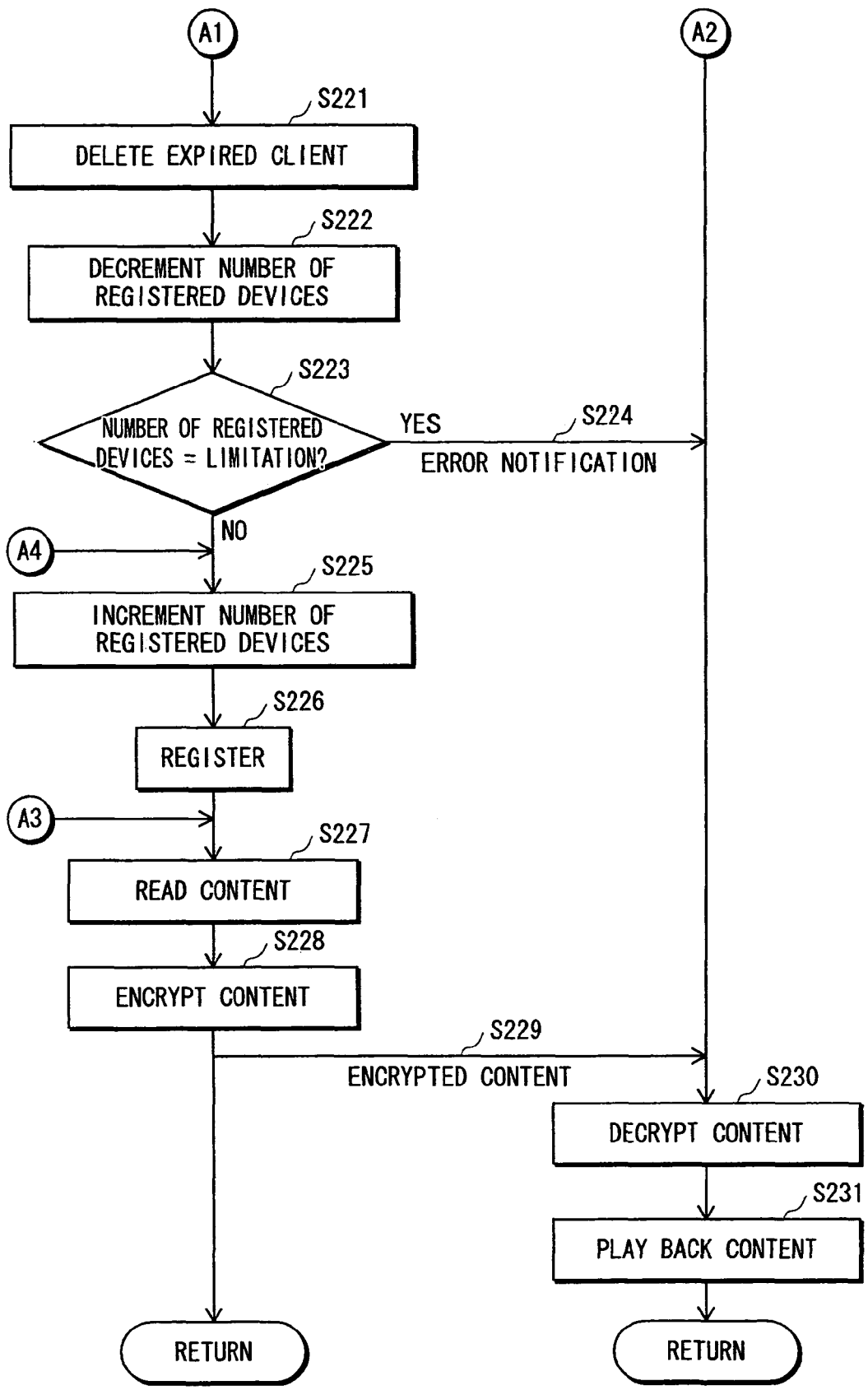
FIG. 9 is a flowchart showing the registration and content distribution operation in the device registration system 1, continuing from FIG. 8.

FIGS. 8 and 9 are flowcharts showing the registration and content distribution operation in the device registration system 1. This operation corresponds to steps S101, S102, and S103 shown in FIG. 7.

The following describes a specific example where the PC 20 requests content from the server apparatus 10, though the same operation is applicable to clients other than the PC 20.

First, the input unit 204 in the PC 20 receives an input of selecting content from the user (step S201). The request generation unit 203 in the PC 20 generates a content request including a content ID of the selected content and the device ID (ID_0020) stored in the device ID storage unit 202 (step S202). The input/output unit 207 transmits the content request generated by the request generation unit 203 to the server apparatus 10 via the network 30, and the input/output unit 109 in the server apparatus 10 receives the content request (step S203).

Following this, the authentication unit 101 in the server apparatus 10 and the authentication unit 201 in the PC 20 perform an authentication and session key sharing operation (step S204).

The server apparatus 10 judges whether the registration information of the PC 20 is already registered in the registration list and also the expiration time of the PC 20 is not exceeded yet (step S205).

If the registration information of the PC 20 is registered in the registration list and the expiration time of the PC 20 is not exceeded (step S205: YES), the server apparatus 10 proceeds to step S227. If the registration information of the PC 20 is not registered or if the registration information is registered but the expiration time is exceeded (step S205: NO), the device number control unit 103 judges whether the number of registered devices is equal to the device number limitation (step S206).

If the number of registered devices is not equal to the device number limitation (step S206: NO), that is, if the number of registered devices is below the device number limitation, the server apparatus 10 proceeds to step S225. If the number of registered devices is equal to the device number limitation (step S206: YES), the expiration time management unit 105 reads the registration list from the registration list management unit 102, and acquires the current date and time from the clock 104. For each of five pieces of registration information in the registration list, the expiration time management unit 105 compares an expiration time in the registration information with the current date and time, to check whether an expiration time in any registration information is exceeded (step S207).

If there is no expired client (step S208: NO), the registration reservation unit 106 in the server apparatus 10 proceeds to step S210. If there is an expired client (step S208: YES), the expiration time management unit 105 reads a deletion prohibition time from the registration information of the expired client, and judges whether the current date and time does not exceed the deletion prohibition time (step S209).

If the deletion prohibition time is not exceeded (step S209: YES), the registration reservation unit 106 in the server apparatus 10 generates registration reservation information (step S210), and adds the registration reservation information to the registration reservation list.

If the deletion prohibition time is exceeded (step S209: NO), the registration list management unit 102 deletes the registration information of the expired client from the registration list (step S221).

Next, the device number control unit 103 decrements the number of registered devices (step S222), and judges whether the number of registered devices is equal to the device number limitation (step S223).

If the number of registered devices is equal to the device number limitation (step S223: YES), the device number control unit 103 transmits an error notification to the PC 20 via the input/output unit 109 and the network 30 (step S224). If the number of registered devices is not equal to the device number limitation.(step S223: NO), that is, if the number of registered devices is below the device number limitation, the device number control unit 103 increments the number of registered devices (step S225).

Next, the registration list management unit 102 generates the registration information of the PC 20, and registers the generated registration information to the registration list (step S226).

Following this, the content distribution unit 108 reads the content corresponding to the content ID included in the content request received in step S203, from the content storage unit 107 (step S227). The content distribution unit 108 also receives a session key shared with the PC 20 in step S204, from the authentication unit 101. The content distribution unit 108 encrypts the content using the session key as an encryption key, to generate encrypted content (step S228). The content distribution unit 108 transmits the encrypted content to the PC 20 via the input/output unit 109 and the network 30, and the PC 20 receives the encrypted content (step S229).

The storage unit 206 in the PC 20 receives the session key from the authentication unit 201, decrypts the encrypted content using the session key as a decryption key (step S230), and displays the decrypted content on the display unit 205 (step S231).

3. Authentication and Session Key Sharing Operation

Figure 10:
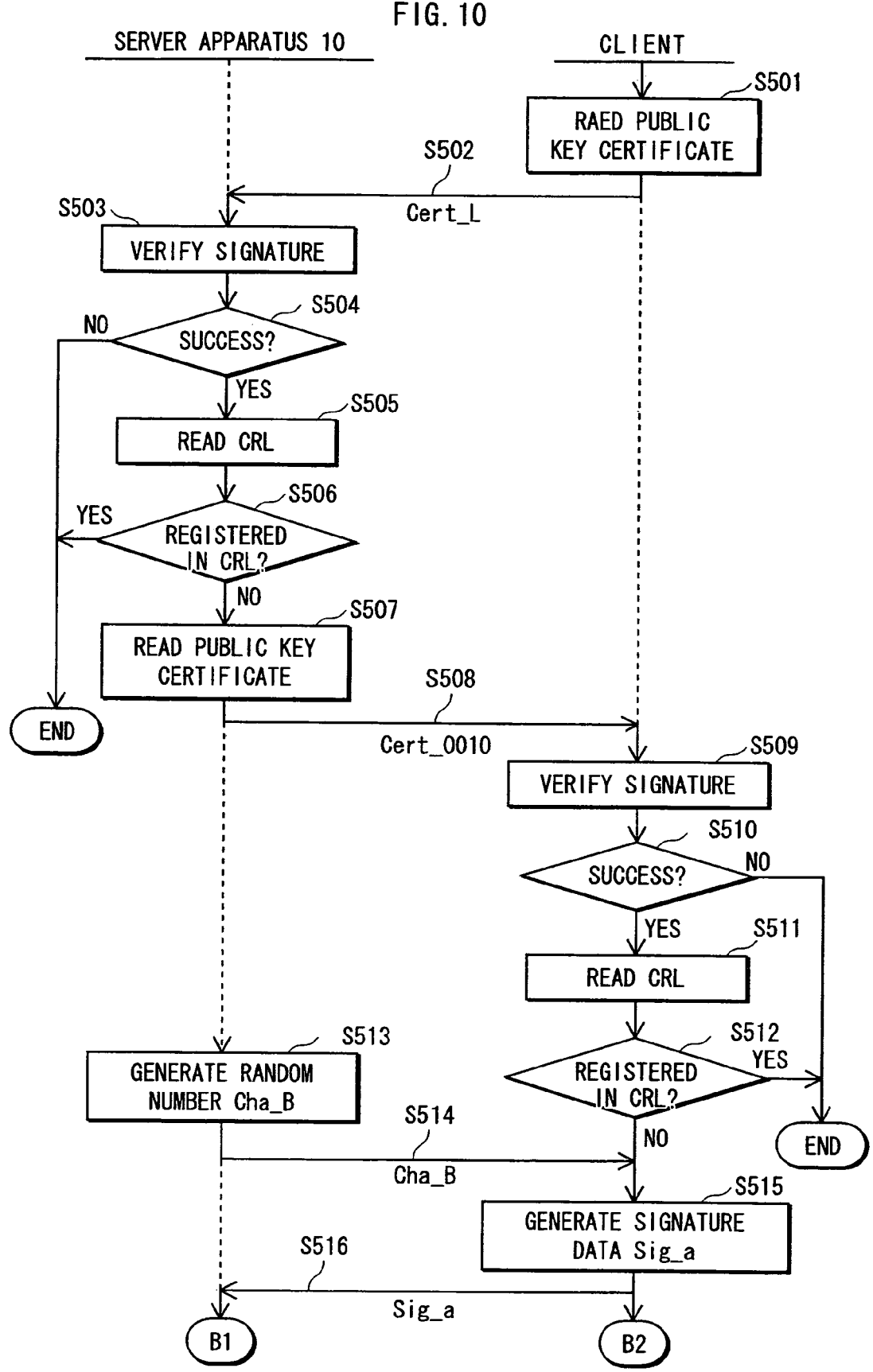
FIG. 10 is a flowchart showing an authentication and session key sharing operation in the device registration system 1, continuing to FIG. 11.
Figure 11:
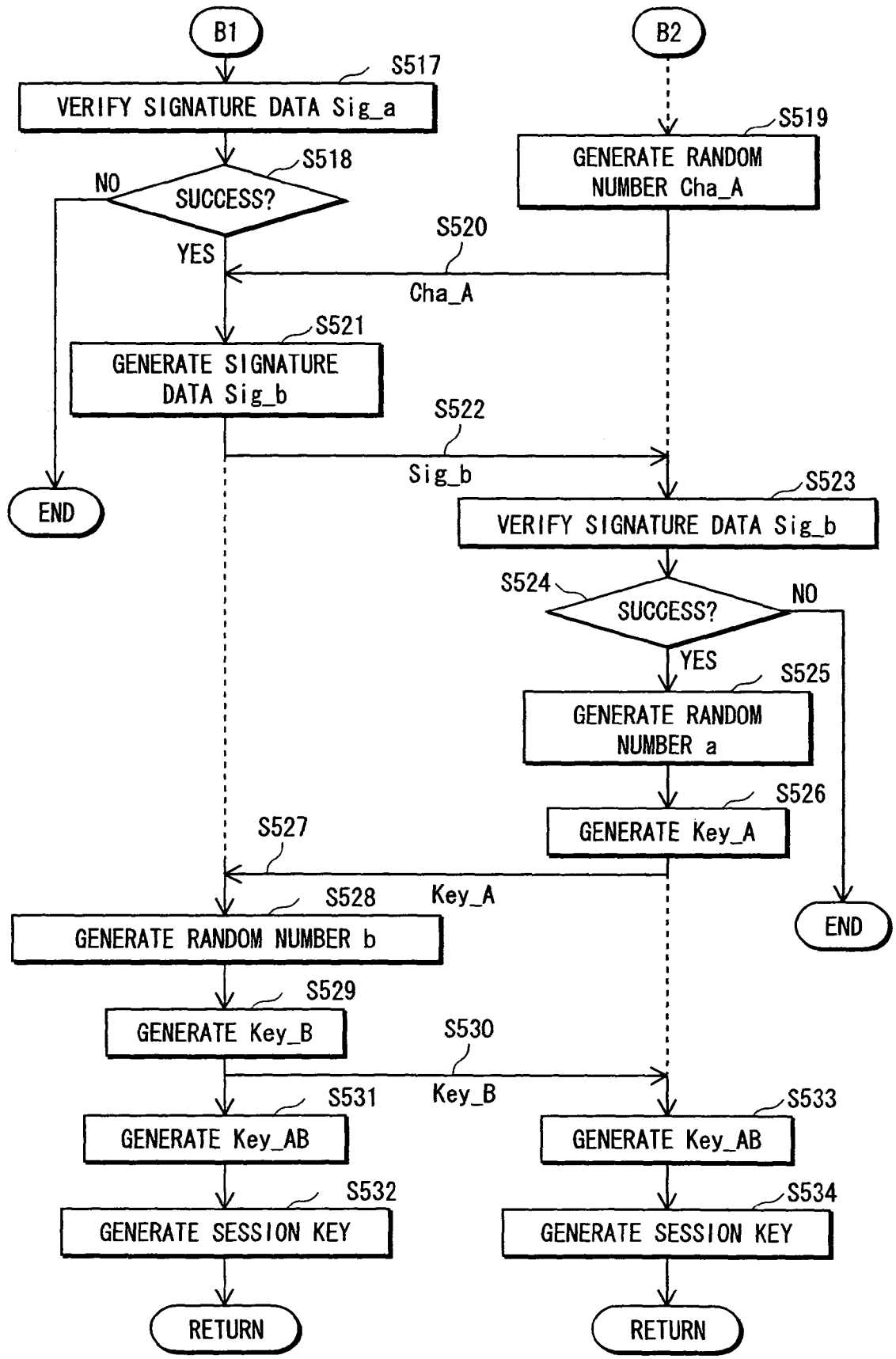
FIG. 11 is a flowchart showing the authentication and session key sharing operation in the device registration system 1, continuing from FIG. 10.

FIGS. 10 and 11 are flowcharts showing the authentication and session key sharing operation by the server apparatus 10 and a client. This operation corresponds to step S204 shown in FIG. 8 and step S404 shown in FIG. 13.

The following describes a specific example where the client is the PC 20, in the same manner as above.

Let Gen( ) be a key generation function, and Y be a parameter unique to the system. The key generation function Gen( ) satisfies Gen(X, Gen(y, Z))=Gen(y, Gen(X, Z)). The key generation function can be realized by any known technique and so its detailed explanation has been omitted here.

The authentication unit 201 in the PC 20 reads the public key certificate Cert_L from the internal storage area (step S501). In the case of the PC 20, L=0020.

The input/output unit 207 in the PC 20 transmits Cert_0020 to the server apparatus 10 via the network 30, and the input/output unit 109 in the server apparatus 10 receives Cert_0020 (step S502).

The server apparatus 10 applies a signature verification algorithm to the signature data Sig_0020CA included in the public key certificate Cert_0020 using the public key PK_CA of the CA, for signature verification (step S503). Here, the server apparatus 10 knows the public key PK_CA of the CA. If the verification results in a failure (step S504: NO), the server apparatus 10 ends the operation. If the verification results in a success (step S504: YES), the authentication unit 101 in the server apparatus 10 reads the CRL from the internal storage area (step S505), and judges whether ID_0020 included in the public key certificate Cert_0020 is registered in the CRL.

When judging that ID_0020 is registered in the CRL (step S506: YES), the server apparatus 10 ends the operation. When judging that ID_0020 is not registered in the CRL (step S506: NO), the authentication unit 101 in the server apparatus 10 reads the public key certificate Cert_0010 from the internal storage area (step S507). The input/output unit 109 transmits the public key certificate Cert_0010 to the PC 20 via the network 30, and the input/output unit 207 in the PC 20 receives Cert_0010 (step S508).

The authentication unit 201 in the PC 20 receives the public key certificate Cert_0010, and applies the signature verification algorithm to the signature data Sig_0010CA included in Cert_0010 using the public key PK_CA of the CA, for signature verification (step S509). Here, the PC 20 and each client know the public key PK_CA of the CA. If the verification results in a failure (step S510: NO), the PC 20 ends the operation. If the verification results in a success (step S510: YES), the authentication unit 201 reads the CRL from the internal storage area (step S511), and judges whether ID_0010 included in the public key certificate Cert_0010 is registered in the CRL.

When judging that ID_0010 is registered in the CRL (step S512: YES), the PC 20 ends the operation. When judging that ID_0010 is not registered in the CRL (step S512: NO), the PC 20 continues the operation.

Following step S507, the authentication unit 101 in the server apparatus 10 generates a random number Cha_B (step S513). The input/output unit 109 transmits the random number Cha_B to the PC 20 via the network 30, and the input/output unit 207 in the PC 20 receives the random number Cha_B (step S514).

The authentication unit 201 in the PC 20 reads the secret. key SK_0020, and applies a signature generation algorithm using the read secret key SK_0020 and the received random number Cha_B to generate signature data Sig_a (step S515). The input/output unit 207 transmits the signature data Sig_a to the server apparatus 10 via the network 30, and the input/output unit 109 in the server apparatus 10 receives the signature data Sig_a (step S516).

The authentication unit 101 in the server apparatus 10 receives the signature data Sig_a, and applies the signature verification algorithm to the signature data Sig_a using the public key PK_0020 of the PC 20 received in the form of being included in Cert_0020 in step S502, for signature verification (step S517). If the verification results in a failure (step S518: NO), the server apparatus 10 ends the operation. If the verification results in a success (step S518: YES), the server apparatus 10 continues the operation.

On the other hand, following step S515, the authentication unit 201 in the PC 20 generates a random number Cha_A (step S519). The input/output unit 207 transmits the random number Cha_A to the server apparatus 10 via the network 30, and the input/output unit 109 in the server apparatus 10 receives the random number Cha_A (step S520).

The authentication unit 101 in the server apparatus 10 applies the signature generation algorithm to the received random number Cha_A using the secret key SK_0010 held therein, to generate signature data Sig_b (step S521). The input/output unit 109 transmits the signature data Sig_b to the PC 20 via the network 30, and the input/output unit 207 in the PC 20 receives the signature data $Sig_b$ (step S522).

The authentication unit 201 in the PC 20 receives the signature data Sig_b, and applies the signature verification algorithm to the signature data Sig_b using the public key PK_0010 of the server apparatus 10 received in the form of being included in Cert_0010 in step S508, for signature verification (step S523). If the verification results in a failure (step S524: NO), the PC 20 ends the operation. If the verification results in a success (step S524: YES), the authentication unit 201 in the PC 20 generates a random number a (step S525), and generates Key_A=Gen(a, y) using the generated random number a (step S526). The input/output unit 207 transmits Key_A to the server apparatus 10 via the network 30, and the input/output unit 109 in the server apparatus 10 receives Key_A (step S527).

The authentication unit 101 in the server apparatus 10 receives Key_A, generates a random number b (step S528), and generates Key_B=Gen (b, Y) using the generated random number b (step S529). The input/output unit 109 transmits Key_B to the PC 20 via the network 30, and the input/output unit 207 in the PC 20 receives Key_B (step S530).

The authentication unit 101 in the server apparatus 10 generates Key_AB=Gen(b, Key_A)=Gen(b, Gen(a, Y))

using the random number b generated in step S528 and Key_A received in step S527 (step S531), and sets Key_AB as a session key (step S532).

The authentication unit 201 in the PC 20 receives Key_B in step S530. The authentication unit 201 generates Key_AB=Gen(a, Key_B)=Gen(a, Gen(b, y)) using Key_B and the random number a generated in step S525 (step S533), and sets Key_AB as a session key (step S534).

4. Operation of the Registration Reservation Unit

Figure 12:
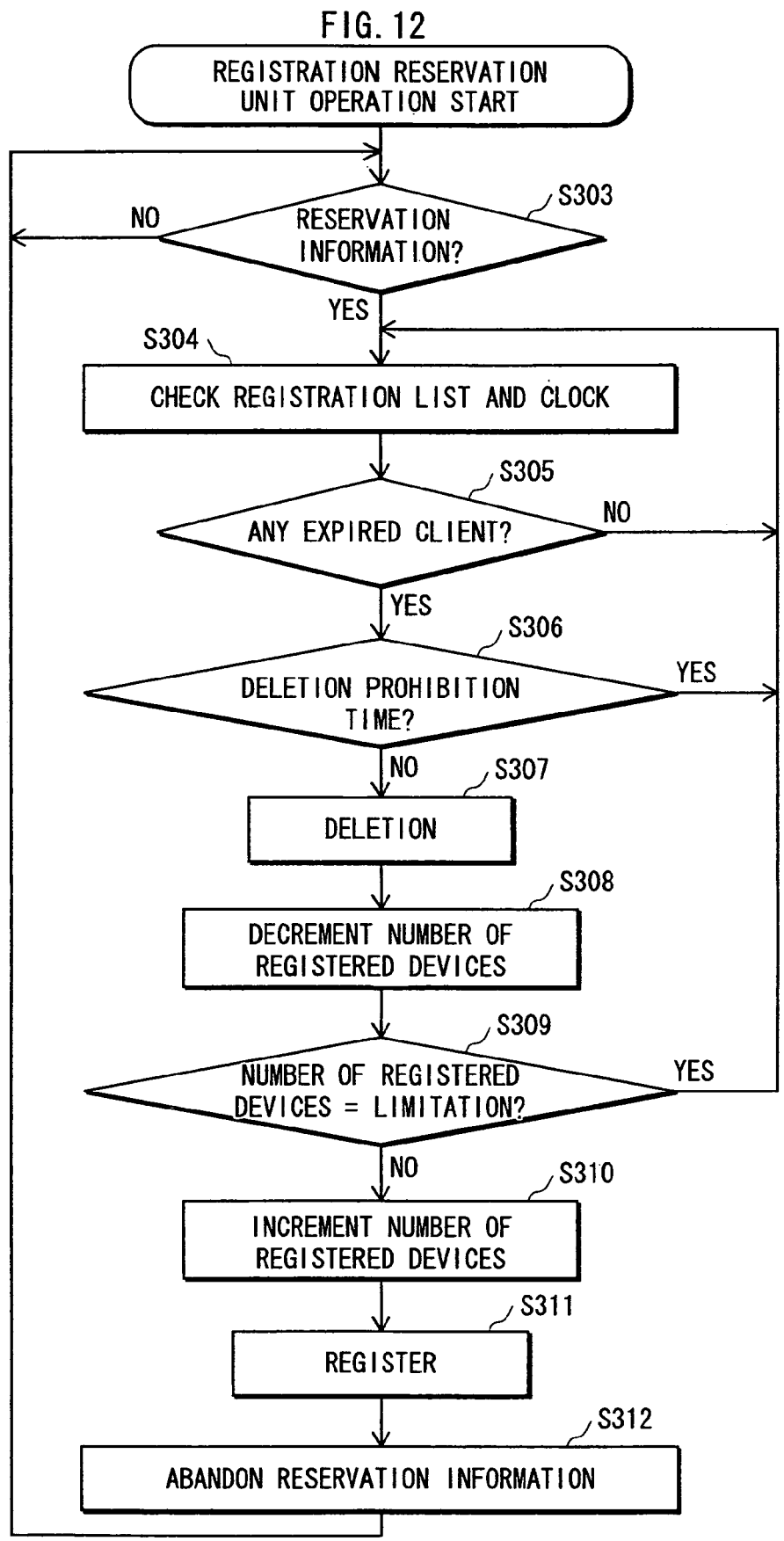
FIG. 12 is a flowchart showing an operation of a registration reservation unit 106.

FIG. 12 is a flowchart showing an operation of the registration reservation unit 106. This operation is performed independently of other operations.

The registration reservation unit 106 judges whether the registration reservation list contains any registration reservation information (step S303).

If the registration reservation list contains no registration reservation information (step S303: NO), that is, if there is no client waiting for registration, the registration reservation unit 106 repeats step S303.

If the registration reservation list contains registration reservation information (step S303: YES), that is, if there is a client waiting for registration, the registration reservation unit 106 acquires the registration list from the registration list management unit 102, and acquires the current date and time from the clock 104 (step S304). The registration reservation unit 106 compares an expiration time of each piece of registration information with the current date and time, to judge whether an expiration time of any client is exceeded (step S305). If there is no client whose expiration time is exceeded (step S305: NO), the registration reservation unit 106 returns to step S304.

If there is a client whose expiration time is exceeded (step S305: YES), the registration reservation unit 106 judges whether the current date and time exceeds a deletion prohibition time in the registration information (step S306). If the deletion prohibition time is not exceeded (step S306: YES), the registration reservation unit 106 returns to step S304. If the deletion prohibition time is exceeded (step S306: NO), the registration reservation unit 106 deletes the registration information of the expired client from the registration list (step S307). After this, the device number control unit 103 decrements the number of registered devices (step S308), and judges whether the number of registered devices is equal to the device number limitation (step S309).

If the number of registered devices is equal to the device number limitation (step S309: YES), the server apparatus 10 returns to step S304. If the number of registered devices is not equal to the device number limitation (step S309: NO), that is, if the number of registered devices is below the device number limitation, the device number control unit 103 increments the number of registered devices (step S310).

Next, the registration reservation unit 106 instructs the registration list management unit 102 to generate registration information of a client identified by a device ID included in the registration reservation information (step S311).

The registration reservation unit 106 abandons the registration reservation information of the client for which the generation of the registration information is instructed in step S311 (step S312), and then returns to step S303.

If step S309 results in YES, an error notification may be sent to the client waiting for registration, instead of returning to step S303.

Also, if the registration reservation list contains more than one piece of registration reservation information, the registration reservation unit 106 performs the registration for registration reservation information having an earliest registration reservation time first.

5. Deletion Operation

Figure 13:
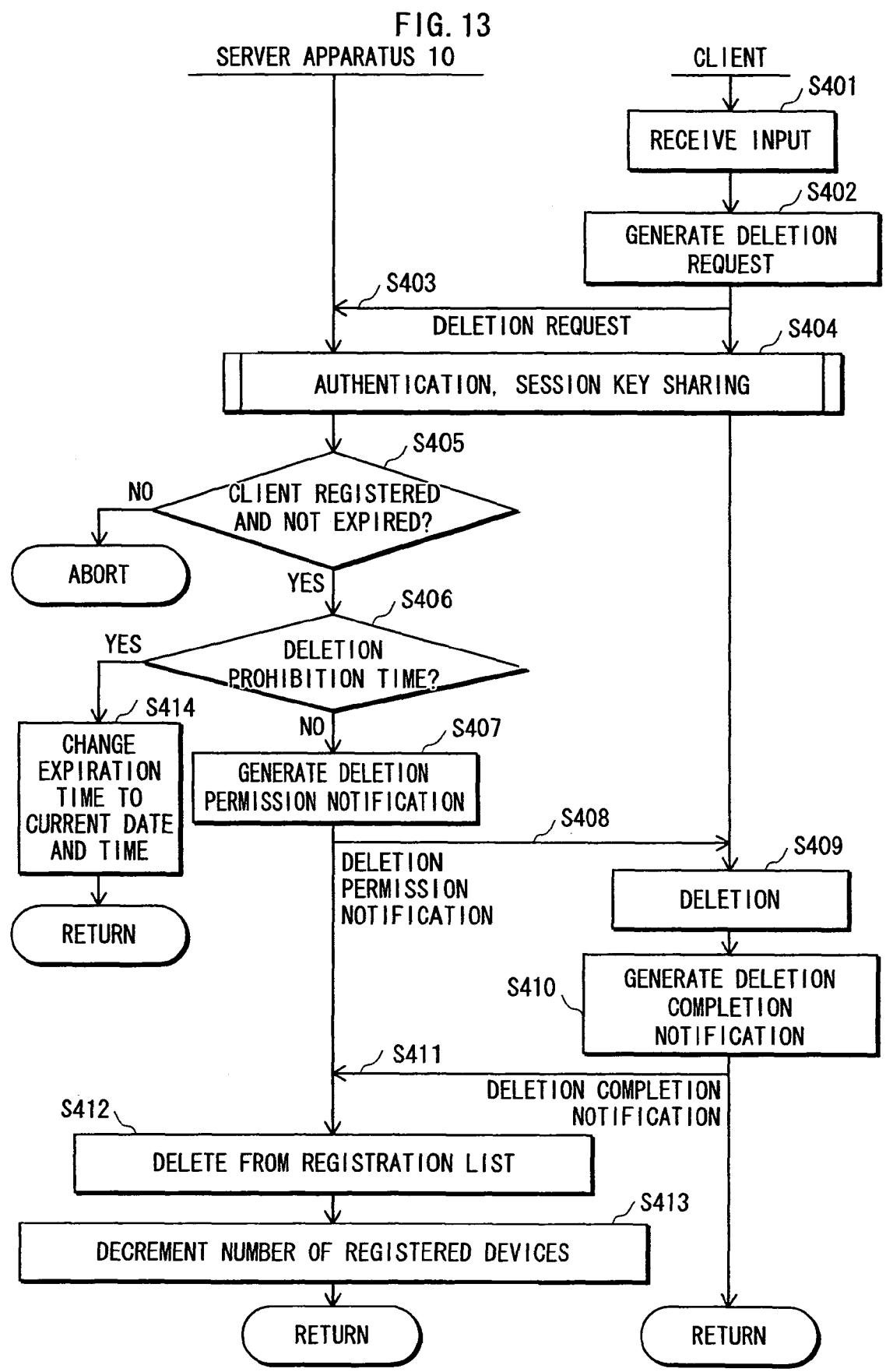
FIG. 13 is a flowchart showing a deletion operation in the device registration system 1.

FIG. 13 is a flowchart showing the operation of deleting a client in the device registration system 1. This operation corresponds to steps S104 and S105 shown in FIG. 7.

The following describes a specific example where the PC 20 requests the server apparatus 10 for withdrawal from the AD, though the same operation is applicable to clients other than PC 20.

First, the input unit 204 in the PC 20 receives an input of withdrawing from the AD, from the user (step S401). Following this, the request generation unit 203 reads the device ID (ID_0020) stored in the device ID storage unit 202, and generates a deletion request including ID_0020 (step S402).

The input/output unit 207 transmits the deletion request to the server apparatus 10 via the network 30, and the input/output unit 109 in the server apparatus 10 receives the deletion request (step S403).

After this, the authentication unit 101 in the server apparatus 10 and the authentication unit 201 in the PC 20 perform the authentication and session key sharing operation (step S404). Step S404 is the same as the operation shown in the flowcharts of FIGS. 10 and 11.

The expiration time management unit 105 in the server apparatus 10 judges whether the registration information of the PC 20 is registered in the registration list management unit 102 and also the expiration time of the PC 20 is not exceeded (step S405). If the registration information of the PC 20 is not registered in the registration list management unit 102 or if the registration information is registered but the expiration time is exceeded (step S405: NO), the server apparatus 10 ends the deletion operation.

If the registration information of the PC 20 is registered in the registration list management unit 102 and also the expiration time is not exceeded (step S405: YES), the expiration time management unit 105 judges whether the deletion prohibition time of the PC 20 is not exceeded (step S406). If the deletion prohibition time is not exceeded (step S406 YES), the expiration time management unit 105 instructs the registration list management unit 102 to change the expiration time in the registration information of the PC 20 to the current date and time, and the registration list management unit 102 changes the expiration time (step S414).

If the deletion prohibition time is exceeded (step S406: NO), the expiration time management unit 105 generates a deletion permission notification that the withdrawal from the AD is permitted, for the PC 20 (step S407). The input/output unit 109 transmits the deletion permission notification to the PC 20 via the network 30, and the input/output unit 207 in the PC 20 receives the deletion permission notification (step S408).

Having received the deletion permission notification, the PC 20 performs a deletion process by deleting content and a content list stored in the storage unit 206 and the like (step S409). Once the deletion process has completed, the request generation unit 203 in the PC 20 generates a deletion completion notification (step S410). The input/output unit 207 transmits the deletion completion notification to the server apparatus 10 via the network 30, and the input/output unit 109 in the server apparatus 10 receives the deletion completion notification (step S411).

Next, the registration list management unit 102 deletes the registration information of the PC 20 from the registration list (step S412), and the device number control unit 103 decrements the number of registered devices (step S413).

If the expiration time is already exceeded in step S405 (step S405: NO), the server apparatus 10 may operate to notify the PC 20 of the expiration.

Second Embodiment

The following describes a device registration system 2 as a second embodiment of the present invention.

Like the device registration system 1 of the first embodiment, the device registration system 2 forms an AD such as the one shown in FIG. 2, and allows clients to use content held in a server apparatus within a range of the AD.

<Structure>

Figure 14:
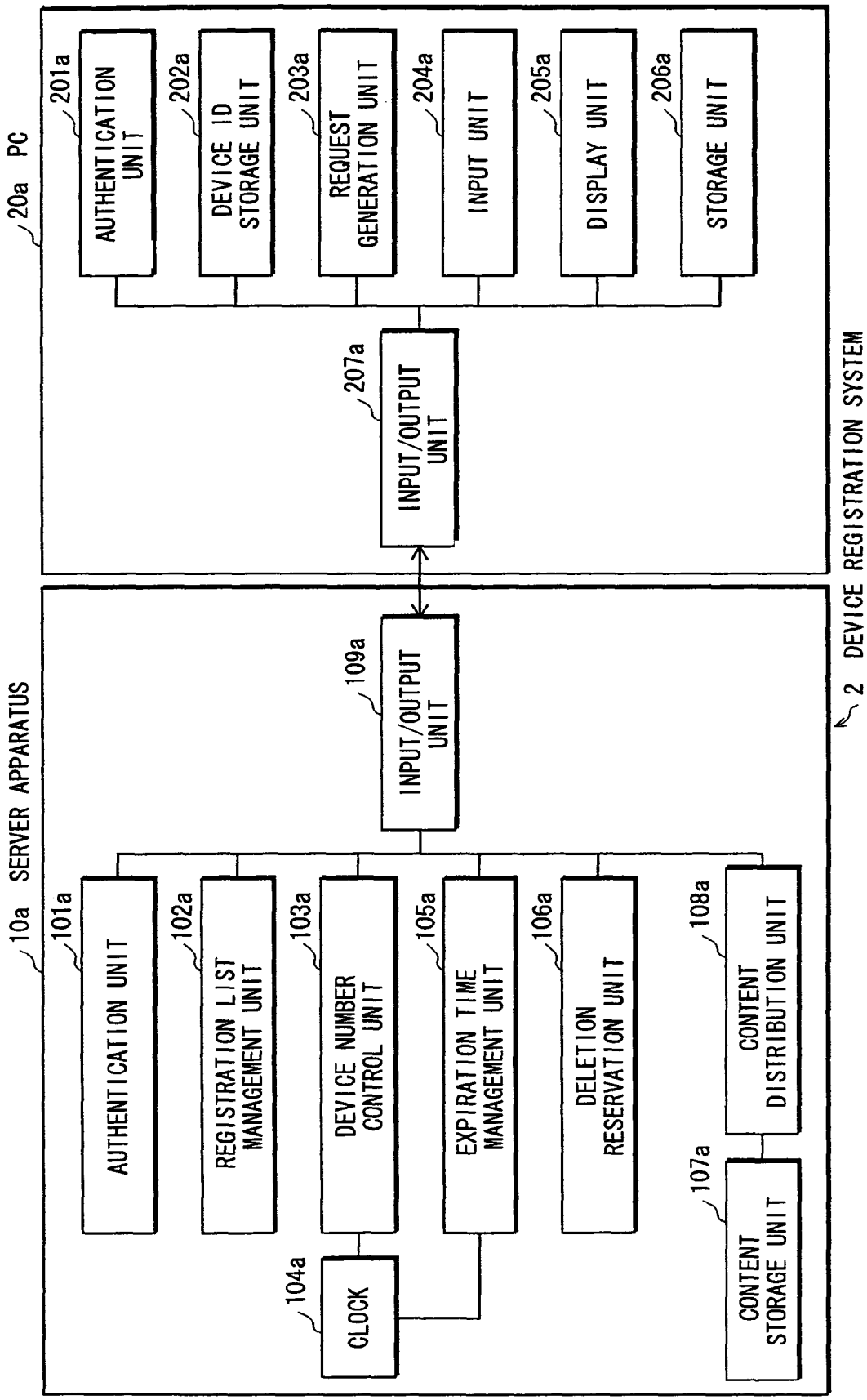
FIG. 14 is a functional block diagram showing functional structures of a server apparatus 10a and a PC 20a in a device registration system 2 of a second embodiment.

FIG. 14 shows a structure of the device registration system 2. FIG. 14 only shows a server apparatus 10a and a PC 20a, and does not show clients other than the PC 20a. In actuality, however, a limitation on a number of registered devices in the device registration system 2 is set to five, as shown in FIG. 1. Also, the server apparatus 10a and the PC 20a are connected by a network, though not illustrated.

1. Structure of the Server apparatus 10a

The server apparatus 1a includes an authentication unit 101a, a registration list management unit 102a, a device number control unit 103a, a clock 104a, an expiration time management unit 105a, a deletion reservation unit 106a, a content storage unit 107a, a content distribution unit 108a, and an input/output unit 109a, as shown in FIG. 14.

The difference from the functional block diagram of the server apparatus 10 shown in FIG. 3 lies in that the registration reservation unit 106 in the server apparatus 10 has been replaced with the deletion reservation unit 106a in the server apparatus 10a.

The authentication unit 101a, the clock 104a, the expiration time management unit 105a, the content distribution unit 108a, and the input/output unit 109a have the same functions as the authentication unit 101, the clock 104, the expiration time management unit 105, the content distribution unit 108, and the input/output unit 109, and so their explanation has been omitted here.

The following mainly describes the difference from the server apparatus 10 of the first embodiment.

(1) Registration List Management Unit 102a

The registration list management unit 102a stores a registration list of the members of the AD.

FIG. 15 shows a data structure of a registration list 410 as a specific example of the registration list. As shown in the drawing, the registration list 410 includes registration information 411, 412, 413, 414, and 415. Unlike the registration information in the first embodiment, each piece of registration information in the registration list 410 contains a device ID, an expiration time, and a deletion reservation flag.

The device ID and the expiration time are the same as those in the first embodiment.

The deletion reservation flag is information showing whether a deletion reservation is set for the client. If the deletion reservation flag is 1, the deletion reservation is set for the client. If the deletion reservation flag is 0, the deletion reservation is not set for the client.

If the deletion reservation is set for the client, neither the registration information of the client is deleted from the registration list nor the number of registered devices is decremented, but the client cannot use content held in the server apparatus 10a. When the current date and time exceeds a deletion time specified in the deletion reservation unit 106a in a state where the deletion reservation is set for the client, the registration information is deleted and the number of registered devices is decremented.

In the example of FIG. 15, the deletion reservation is set for three clients having device IDs ID_0021a, ID_0023a, and ID_0020a. Note here that the device having ID_0020a is the PC 20a.

The registration list management unit 102a updates the registration list by generating registration information and writing the generated registration information to the registration list or by deleting registration information from the registration list, in the same manner as the registration list management unit 102.

(2) Device Number Control Unit 103a

The device number control unit 103a manages the number of registered devices and the device number limitation, as in the first embodiment. The device number control unit 103a increments/decrements the number of registered devices within the device number limitation, as the registration list management unit 102a deletes/adds registration information from/to the registration list.

Also, the device number control unit 103a decrements the number of registered devices, when instructed by the deletion reservation unit 106a.

(3) Deletion Reservation Unit 106a

The deletion reservation unit 106a has a deletion reservation function of setting a deletion reservation when the server apparatus 10a wants to delete a client whose expiration time is not yet exceeded, from the AD.

Before explaining the deletion reservation function of the deletion reservation unit 106a, the use of content by an offline device is explained first. As mentioned earlier, an offline device can be disconnected from the network and used outside the home. In order to enable the use of content in the state where the offline device is brought outside while ensuring the concept of the AD, a content use expiration time (content use time limit) is set for the content. The offline device can use the content copied to itself without accessing the server apparatus 10a, until the content use expiration time. Once the content use expiration time is exceeded, the content copied to the offline device is deleted.

In view of the above, suppose the server apparatus 10a deletes the client which is the offline device brought outside the home, from the AD before the expiration time of the client. If the server apparatus 10a merely deletes registration information of the client from the registration list stored in the server apparatus 10a, a new client may be registered to the AD in place of the deleted client.

In such a case, if the content use expiration time of the content copied to the client is not exceeded, though the number of devices registered in the registration list of the registration list management unit 102a is five, in actuality the six devices including the above offline device use the content. This exceeds the 5-device limitation of the AD. The deletion reservation set by the deletion reservation unit 106a is intended to prevent such a situation.

The deletion reservation unit 106a receives a content request from a client which is an offline device. When permitting the client to use content, the deletion reservation unit 106a stores a device ID of the client and a content use expiration time of the content. The stored device ID and content use expiration time are deleted when the content use expiration time is exceeded.

If a client to be deleted from the AD is an offline device disconnected from the network, the deletion reservation unit 106a checks a content use expiration time of content held by that client. When the current date and time does not exceed the content use expiration time, the deletion reservation unit 106a generates deletion reservation information, and writes the generated deletion reservation information to a deletion reservation list. Also, the deletion reservation unit 106a instructs the registration list management unit 102a to set a deletion reservation flag in registration information of the client, to 1.

FIG. 16 shows a data structure of a deletion reservation list 450 as one example of the deletion reservation list. As shown in the drawing, the deletion reservation list 450 includes deletion reservation information 451, 452, and 453, which are each composed of a device ID and a deletion time. The deletion time is the aforementioned content use expiration time.

The deletion reservation information 451 indicates that the client having the device ID ID_0020a holds content that is usable until Jun. 15, 2005. The deletion reservation information 452 indicates that the client having the device ID ID_0021a holds content that is usable until Sep. 1, 2005. The deletion reservation information 453 indicates that the client having the device ID ID_0023a holds content that is usable until Oct. 1, 2005.

The deletion reservation unit 106a periodically acquires time information from the clock 104a, and judges whether the deletion reservation list contains deletion reservation information which shows an exceeded deletion time If any deletion reservation information shows an exceeded deletion time, the deletion reservation unit 106a instructs the registration list management unit 102a to delete registration information having a device ID contained in that deletion reservation information, and also instructs the device number control unit 103a to decrement the number of registered devices. After this, the deletion reservation unit 106a abandons the deletion reservation information from the deletion reservation list.

Also, when an offline device disconnected from the network is reconnected to the network and accesses the server apparatus 10a, the deletion reservation unit 106a checks a registration reservation flag in registration information of that offline device. If the deletion reservation flag is set to 1, that is, if the deletion reservation is set for the offline device, the deletion reservation unit 106a rejects provision of new content to the offline device, and instructs the offline device to delete content held therein. After this, upon being notified of the deletion of the copied content from the offline device, the deletion reservation unit 106a instructs the registration list management unit 102a to delete the registration information of the off line device from the registration list, and instructs the device number control unit 103a to decrement the number of registered devices.

(4) Content Storage Unit 107a

The content storage unit 107a stores a content ID, content, and a content use expiration time of the content, in correspondence with each other.

2. Structure of the PC 20a

The PC 20a includes an authentication unit 201a, a device ID storage unit 202a, a request generation unit 203a, an input unit 204a, a display unit 205a, a storage unit 206a, and an input/output unit 207a, as shown in FIG. 14. These elements have the same functions as those in the PC 20 in the first embodiment.

The following describes the difference from the PC 20.

The device ID storage unit 202a in the PC 20a stores device information indicating that the PC 20a is an offline device, in addition to the device ID (ID_0020a) for uniquely identifying the PC 20a.

The request generation unit 203a reads the device information in addition to the device ID (ID_0020a) from the device ID storage unit 202a, and generates a content request which is made up of a content ID, the device ID, and the device information.

<Operations>

Operations of the device registration system 2 are described below, using flowcharts of FIGS. 17 to 23.

1. Overall Operation of the System

Figure 17:
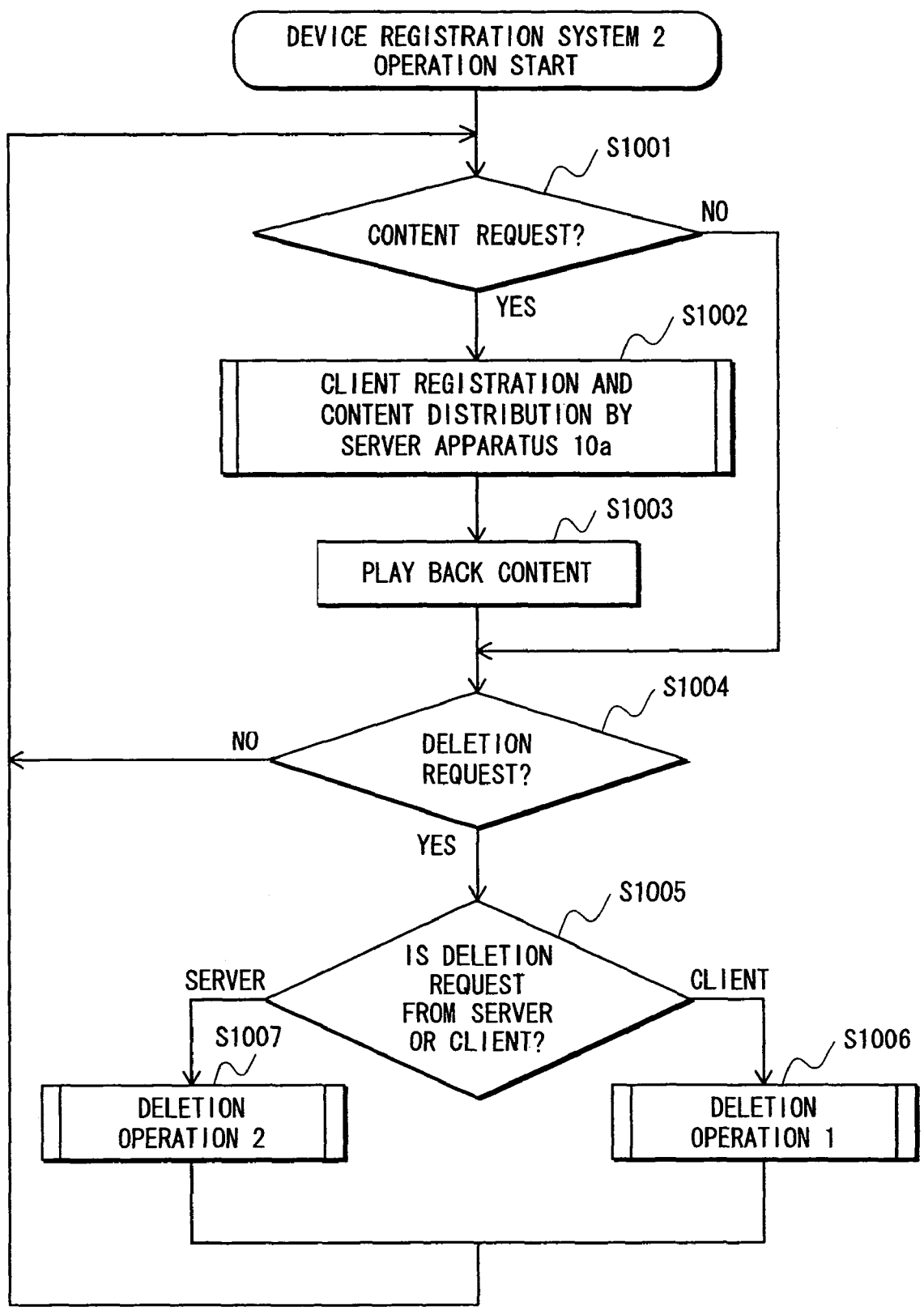
FIG. 17 is a flowchart showing an overall operation of the device registration system 2.

FIG. 17 is a flowchart showing an overall operation of the device registration system 2.

When there is no content request (step S1001: NO) and no deletion request (step S1004: NO) from any client, the device registration system 2 returns to step S1001 without performing any process.

When a content request is issued from a client (step S1001: YES), the device registration system 2 performs an operation of registering the client and distributing content to the client by the server apparatus 10a (step S1002). The client plays back the content acquired from the server apparatus 10a (step S1003). After this, the operation proceeds to step S1004.

When a deletion request is issued from a client (step S1004: YES), the device registration system 2 performs a deletion operation 1 (step S1006) and returns to step S1001 if the deletion request is from a client (step S1005: CLIENT). If the deletion request is from the server apparatus 10a (step S1005: SERVER), on the other hand, the device registration system 2 performs a deletion operation 2 (step S1007) and returns to step S1001.

2. Registration and Content Distribution Operation

Figure 18:
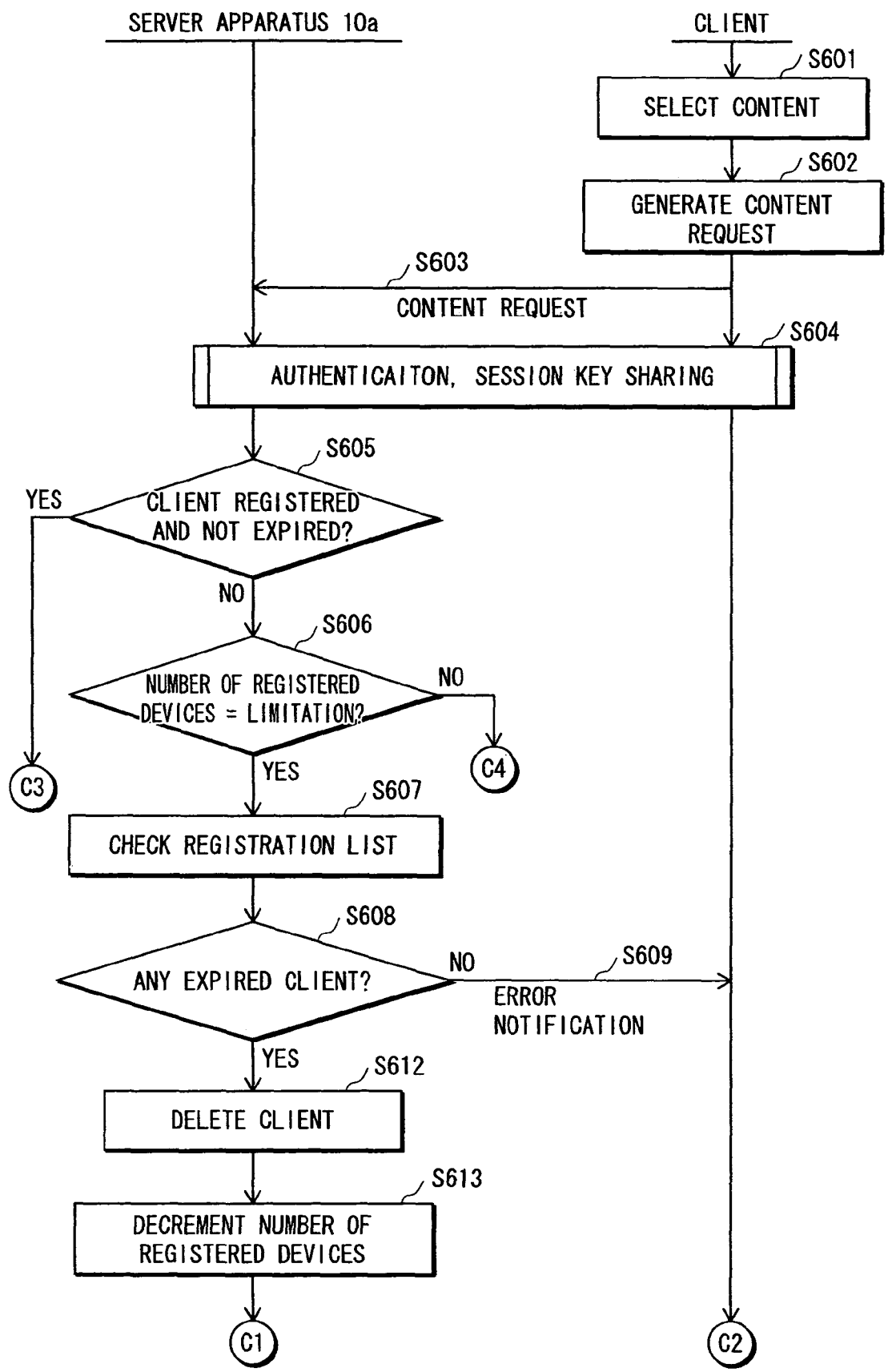
FIG. 18 is a flowchart showing a registration and content distribution operation in the device registration system 2, continuing to FIG. 19.
Figure 19:
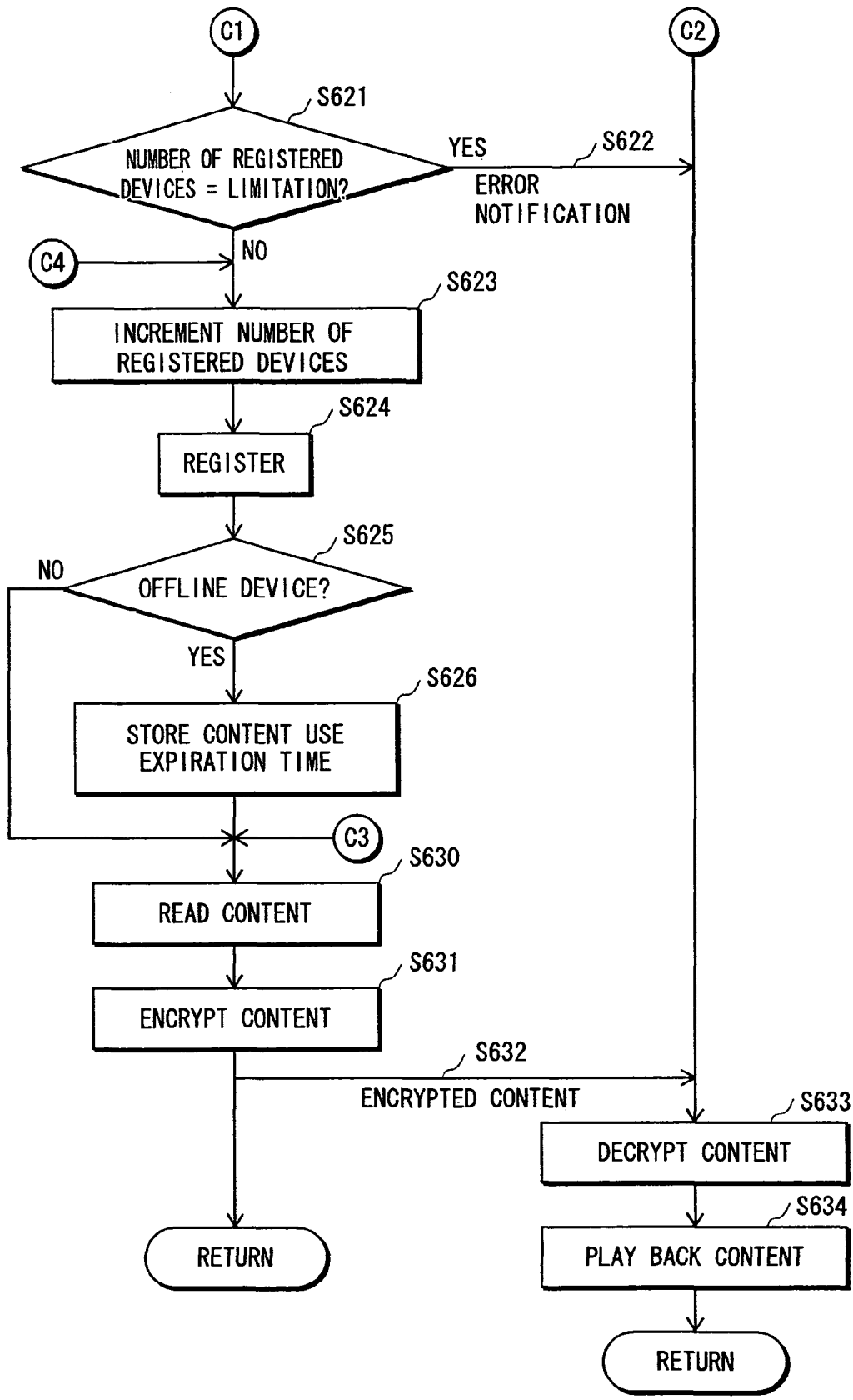
FIG. 19 is a flowchart showing the registration and content distribution operation in the device registration system 2, continuing from FIG. 18.

FIGS. 18 and 19 are flowcharts showing a registration and content distribution operation.

The following describes a specific example where the PC 20a requests content from the server apparatus 10a, though the same operation is applicable to clients other than the. PC 20a.

First, the input unit 204a in the PC 20a receives an input of selecting content from the user (step S601). The request generation unit 203a in the PC 20a generates a content request including a content ID of the selected content, the device ID (ID_0020a) stored in the device ID storage unit 202a, and the device information indicating that the PC 20a is an offline device (step S602). The input/output unit 207a transmits the content request generated by the request generation unit 203a to the server apparatus 10a via the network, and the input/output unit 109a in the server apparatus 10a receives the content request (step S603).

Following this, the authentication unit 101a in the server apparatus 10a and the authentication unit 201a in the PC 20a perform an authentication and session key sharing operation (step S604). Step S604 is the same as the operation shown in FIGS. 11 and 12.

The server apparatus 10a judges whether the registration information of the PC 20a is already registered in the registration list and also the expiration time of the PC 20a is not exceeded yet (step S605).

If the registration information of the PC 20a is registered in the registration list and the expiration time of the PC 20a is not exceeded (step S605: YES), the server apparatus 10a proceeds to step S630. If the registration information of the PC 20a is not registered or if the registration information of the PC 20a is registered but the expiration time is exceeded (step S605: NO), the device number control unit 103a judges whether the number of registered devices is equal to the device number limitation (step S606).

If the number of registered devices is not equal to the device number limitation (step S606: NO), that is, if the number of registered devices is below the device number limitation, the server apparatus 10a proceeds to step S623.

If the number of registered devices is equal to the device number limitation (step S606: YES), the expiration time management unit 105a reads the registration list from the registration list management unit 102a, and acquires the current date and time from the clock 104a. For each of five pieces of registration information in the registration list, the expiration time management unit 105a compares an expiration time with the current date and time, to check whether an expiration time of any registration information is exceeded (step S607).

If there is no expired client (step S608: NO), the expiration time management unit 105a transmits an error notification to the PC 20a via the input/output unit 109a and the network (step S609). If there is an expired client (step S608: YES), the registration list management unit 102a deletes the registration information of the expired client from the registration list (step S612).

Next, the device number control unit 103a decrements the number of registered devices (step S613), and judges whether the number of registered devices is equal to the device number limitation (step S621).

If the number of registered devices is equal to the device number limitation (step S621: YES), the device number control unit 103a transmits an error notification to the PC 20a via the input/output unit 109a and the network (step S622). If the number of registered devices is not equal to the device number limitation (step S621: NO), that is, if the number of registered devices is below the device number limitation, the device number control unit 103a increments the number of registered devices (step S623).

Next, the registration list management unit 102a generates registration information including the device ID of the PC 20a and the expiration time of the PC 20a, and registers the registration information to the registration list (step S624). Here, when generating new registration information, the registration list management unit 102a sets a deletion reservation flag to 0.

Following this, the deletion reservation unit 106a judges whether the PC 20a is an online device or an offline device (step S625). The deletion reservation unit 106a makes this judgment based on the device information included in the content request received in step S603.

If the PC 20a is an online device (step S625: NO), the deletion reservation unit 106a proceeds to step S630.

In this embodiment, the PC 20a is an offline device (step S625: YES) Accordingly, the deletion reservation unit 106a reads a content use expiration time corresponding to the content ID included in the content request received in step S603, from the content storage unit 107a. The deletion reservation unit 106a stores the read content use expiration time in correspondence with the device ID of the PC 20a (step S626).

Next, the content distribution unit 108a reads the content from the content storage unit 107a (step S630). The content distribution unit 108a receives a session key shared with the PC 20a in step S604, from the authentication unit 101a. The content distribution unit 108a encrypts the content using the session key as an encryption key, to generate encrypted content (step S631). The content distribution unit 108a transmits the encrypted content to the PC 20a via the input/output unit 109a and the network, and the PC 20a receives the encrypted content (step S632).

The storage unit 206a in the PC 20a receives the session key from the authentication unit 201a, decrypts the encrypted content using the session key as a decryption key (step S633), and displays the decrypted content on the display unit 205a (step S634).

3. Deletion Operation 1

Figure 20:
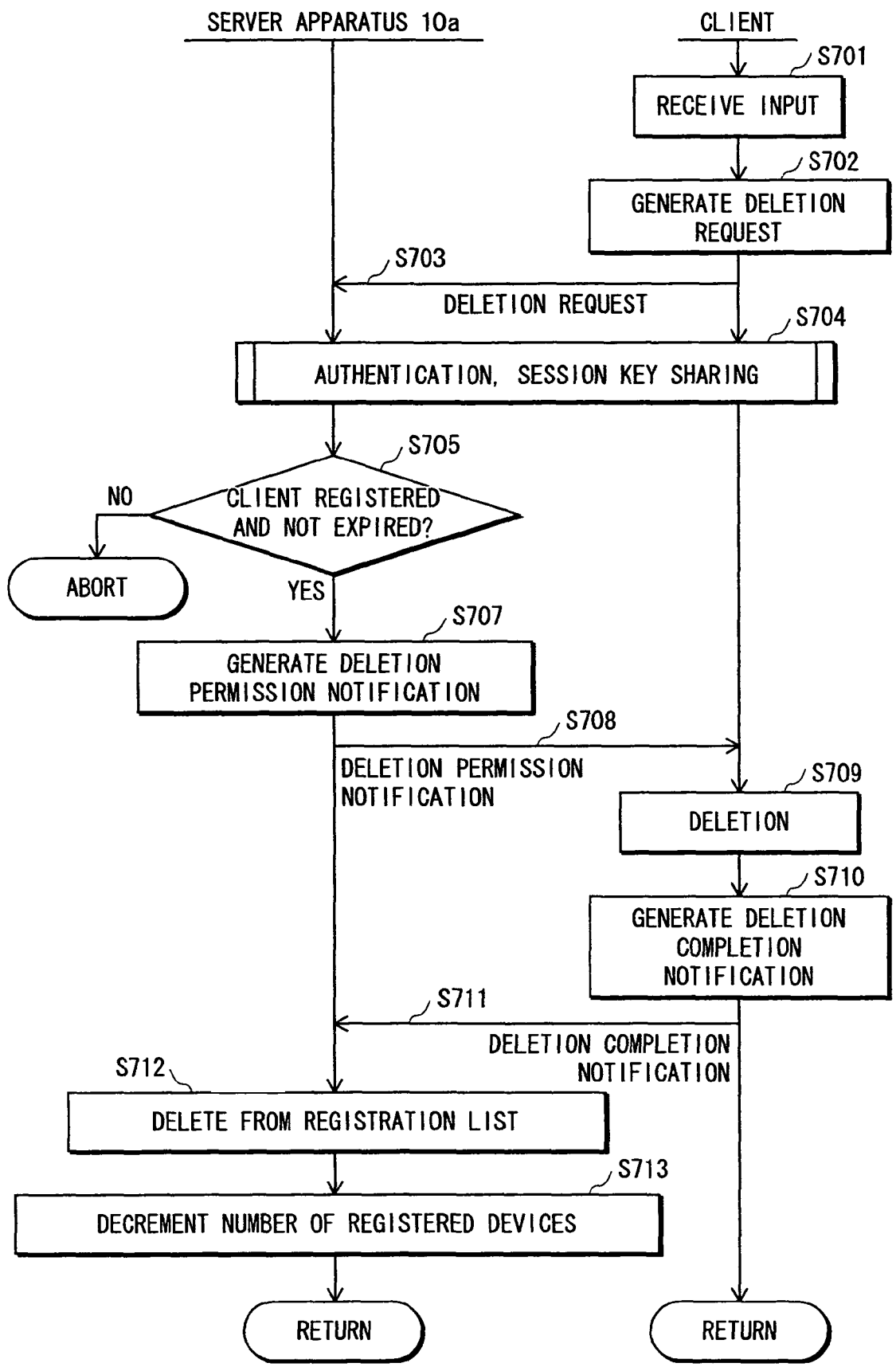
FIG. 20 is a flowchart showing a deletion operation 1 in the device registration system 2.

FIG. 20 is a flowchart showing the deletion operation 1 in the device registration system 2. The following describes a specific example where the PC 20a requests the server apparatus 10a for withdrawal from the AD, though the same operation is applicable to clients other than the PC 20a.

First, the input unit 204a in the PC 20a receives an input of withdrawing from the AD, from the user (step S701). Following this, the request generation unit 203a reads the device ID (ID_0020a) stored in the device ID storage unit 202a, and generates a deletion request including ID_0020a (step S702).

The input/output unit 207a transmits the deletion request to the server apparatus 10a via the network, and the input/output unit 109a in the server apparatus 10a receives the deletion request (step S703).

After this, the authentication unit 101a in the server apparatus 10a and the authentication unit 201a in the PC 20a perform the authentication and session key sharing operation (step S704). Step S704 is the same as the operation shown in the flowcharts of FIGS. 10 and 11.

The expiration time management unit 105a in the server apparatus 10a judges whether the registration information of the PC 20a is registered in the registration list management unit 102a and also the current date and time is within the expiration time of the PC 20a (step S705). If the registration information of the PC 20a is not registered in the registration list management unit 102a or if the registration information of the PC 20a is registered but the expiration time is exceeded (step S705: NO), the server apparatus 10a ends the deletion operation.

If the registration information of the PC 20a is registered in the registration list management unit 102a and also the current date and time is within the expiration time (step S705: YES), the expiration time management unit 105a generates a deletion permission notification that the withdrawal from the AD is permitted, for the PC 20a (step S707). The input/output unit 109a transmits the deletion permission notification to the PC 20a via the network, and the input/output unit 207a in the PC 20a receives the deletion permission notification (step S708).

Having received the deletion permission notification, the PC 20a performs a deletion process by deleting content and a content list stored in the storage unit 206a and the like (step S709). Once the deletion process has completed, the request generation unit 203a in the PC 20a generates a deletion completion notification (step S710). The input/output unit 207a transmits the deletion completion notification to the server apparatus 10a via the network, and the input/output unit 109a in the server apparatus 10a receives the deletion completion notification (step S711).

Next, the registration list management unit 102a deletes the registration information of the PC 20a from the registration list (step S712), and the device number control unit 103a decrements the number of registered devices (step S713).

If the expiration time is already exceeded in step S705 (step S705: NO), the server apparatus 10a may operate to notify the PC 20a of the expiration.

4. Deletion Operation 2

Figure 21:
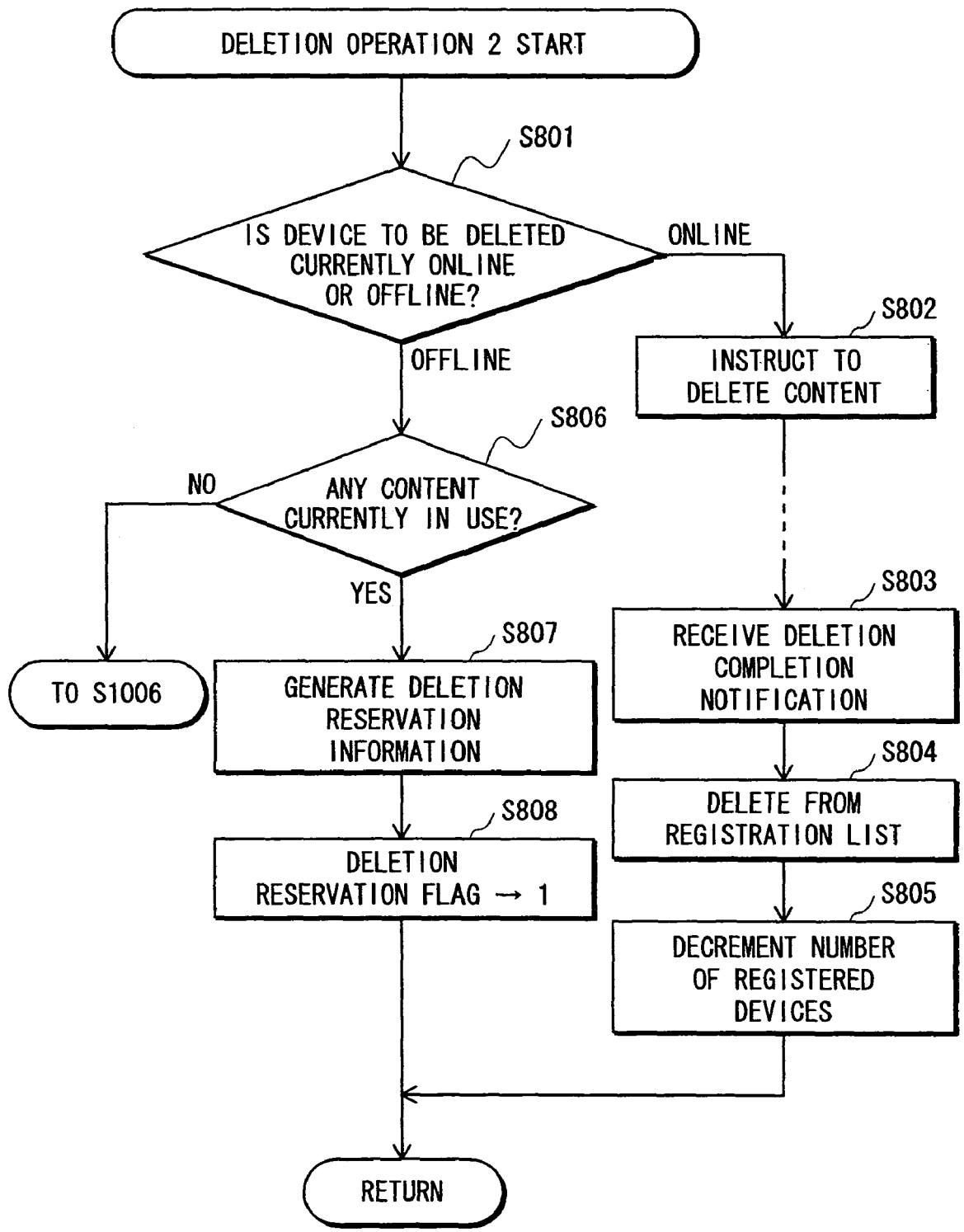
FIG. 21 is a flowchart showing a deletion operation 2 in the device registration system 2.

FIG. 21 is a flowchart showing the deletion operation 2 in the device registration system 2. The deletion operation 2 is an operation performed when a deletion request is issued in the server apparatus 10a. Therefore, the following mainly describes the operation of the server apparatus 10a.

The server apparatus 10a judges whether a client, which the server apparatus 10a wants to delete from the AD, is currently communicable via the network (step S801). If the client is communicable (step S801: ONLINE), the server apparatus 10a instructs the client to delete content, a content list, and the like (step S802). Upon receiving a deletion completion notification that the deletion of content, a content list, and the like has completed from the client (step S803), the server apparatus 10a deletes registration information of the client from the registration list (step S804), and decrements the number of registered devices (step S805).

If the client is not communicable in step S801 (step S801: OFFLINE), the deletion reservation unit 106a in the server apparatus 10a checks a content use expiration time of content which the client is permitted to use, to judge whether the client currently uses any content (step S806). If there is no content currently used by the client (step S806: NO), the server apparatus 10a proceeds to step S1006 (FIG. 17).

If there is content currently used by the client (step S806: YES), the deletion reservation unit 106a generates deletion reservation information based on a device ID of the client and the content use expiration time (step S807). The deletion reservation unit 106a then instructs the registration list management unit 102a to set a deletion reservation flag in the registration information of the client to 1 (step S808).

6. Operation 1 of the Deletion Reservation Unit 106a

Figure 22:
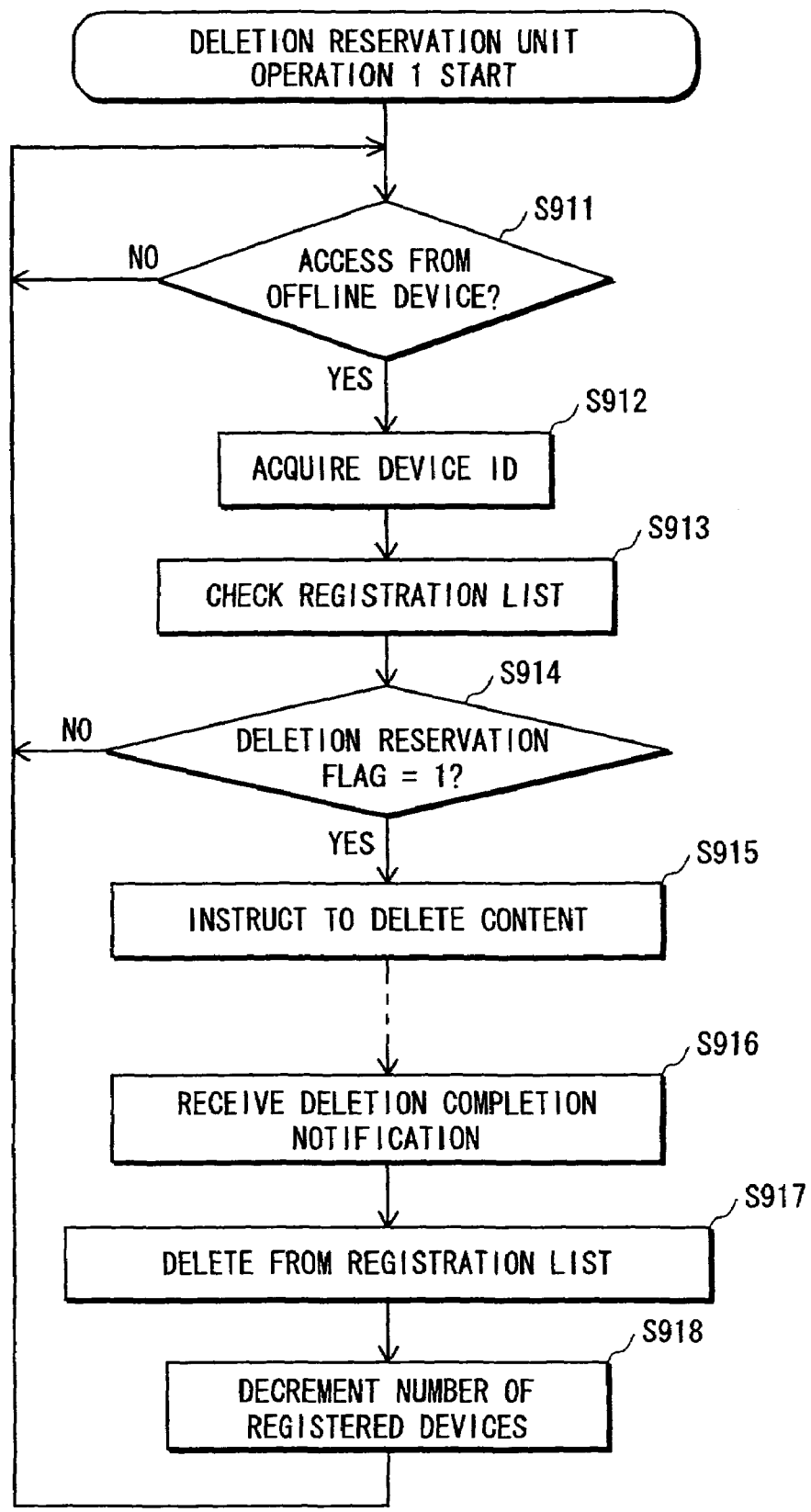

FIG. 22 is a flowchart showing an operation of the deletion reservation unit 106a. This operation is performed independently of other operations.

First, the deletion reservation unit 106a judges whether there is an access from an offline device which has been disconnected from the network (step S911). If there is no access (step S911: NO), the deletion reservation unit 106a repeats step S911. If there is an access (step S911: YES), the deletion reservation unit 106a acquires a device ID from the offline device (step S912).

The deletion reservation unit 106a checks the registration list managed by the registration list management unit 102a (step S913), to judge whether a deletion reservation flag in registration information having the device ID acquired in step S912 is set to 1 (step S914).

If the deletion reservation flag is set to 0 (step S914: NO), the deletion reservation unit 106a returns to step S911. If the deletion reservation flag is set to 1 (step S914: YES), the deletion reservation unit 106a instructs the offline device to delete content held in the offline device (step S915). Upon receiving a deletion completion notification that the deletion of the content has completed from the client (step S916), the deletion reservation unit 106a instructs the registration list management unit 102a to delete the registration information of the client form the registration list (step S917), and also instructs the device number control unit 103a to decrement the number of registered devices (step S918).

6. Operation 2 of the Deletion Reservation Unit 106a

Figure 23:
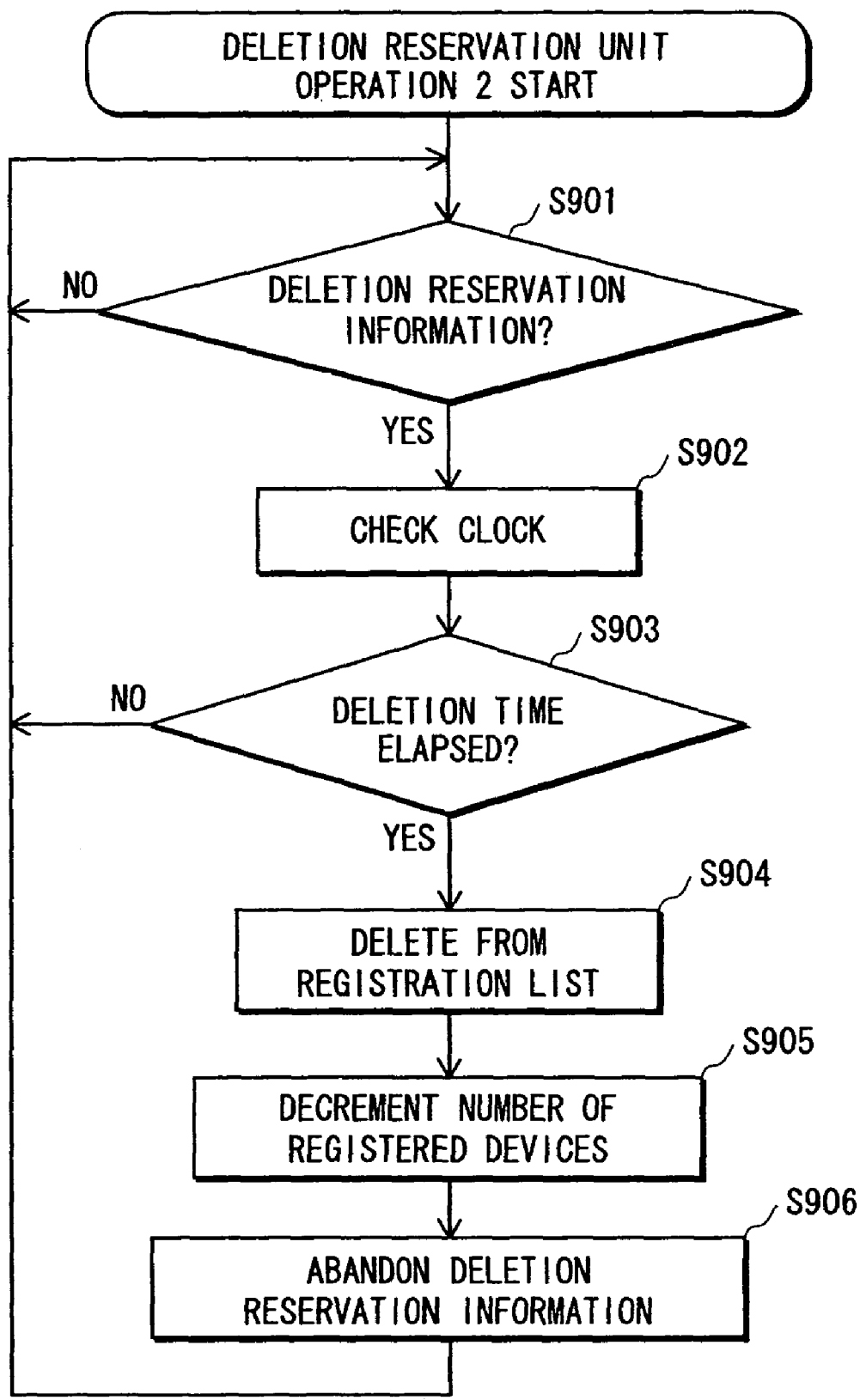

FIG. 23 is a flowchart showing an operation of the deletion reservation unit 106a. This operation is periodically performed independently of other operations.

First, the deletion reservation unit 106a judges whether the stored deletion reservation list contains any deletion reservation information (step S901). If there is no deletion reservation information in the deletion reservation list (step S901: NO), the deletion reservation unit 106a repeats step S901.

If deletion reservation information is contained in the deletion reservation list (step S901: YES), the deletion reservation unit 106a acquires the current date and time from the clock 104a (step S902), and judges whether the current date and time exceeds a deletion time in the deletion reservation information (step S903). If the current date and time does not exceed the deletion time (step S903: NO), the deletion reservation unit 106a returns to step S901. If the current date and time exceeds the deletion time (step S903: YES), the deletion reservation unit 106a instructs the registration list management unit 102a to delete registration information having a device ID contained in the deletion reservation information, from the registration list (step S904).

The deletion reservation unit 106a also instructs the device number control unit 103a to decrement the number of registered devices (step S905), and abandons the deletion reservation information from the deletion reservation list (step S906). The deletion reservation unit 106a then returns to step S901.

<Other Modifications>

Although the present invention has been described by way of the above embodiments, it should be obvious that the present invention is not limited to the above. For example, the following modifications are applicable.

(1) The above embodiments describe the case where one server apparatus is provided in the home, but a plurality of server apparatuses may be provided in the home. In this case, each set of content is accompanied by a server ID of a server apparatus which holds that content.

Also, a client may acquire a server ID from a content list, and generate a content request made up of the server ID, a device ID of the client, a content ID, and device information.

(2) The above embodiments describe an example where the limitation on the number of registered devices is set to five beforehand, but this device number limitation may be changed by the user. Also, the device number limitation may be determined according to an amount of fee paid by the user.

(3) The above embodiments describe the case where the authentication and session key sharing operation by the server apparatus and each client is performed using a public key cipher as shown in FIGS. 10 and 11, but the authentication between the server apparatus and each client in the present invention is not limited to this method. For example, a common key cipher may be used instead of a public key cipher. Also, one-way authentication by the server apparatus on each client may be performed instead of mutual authentication between the server apparatus and each client.

(4) The above embodiments describe the case where upon receiving a content request from a new client, the server apparatus searches the registration list for any expired registration information, and deletes expired registration information from the registration list. However, the timing of searching for expired registration information is not limited to when the server apparatus receives a content request from a new client. For instance, the server apparatus may conduct the search when the server apparatus is turned on, when the server apparatus is not performing any task, or with predetermined time intervals.

Also, if a plurality of pieces of registration information are expired in the registration list, the server apparatus may delete all of the plurality of pieces of expired registration information, or select one or more pieces of registration information to be deleted from the registration list in accordance with the number of new clients. In the latter case, the least recently expired registration information may be deleted first.

(5) The above embodiments describe the case where a time at which registration information is registered in the registration list (AD registration time) is set as the beginning of a valid period during which a client is permitted to use content in the AD, but the beginning of the valid period may be set according to other methods. For example, the beginning of the valid period may be a predetermined time (e.g. one day) after a content request is received from the client.

The above embodiments describe the case where registration information showing only the end of the valid period, i.e. the expiration time, is stored in the registration list managed by the server apparatus, but the registration information may show only the beginning of the valid period, or both the beginning and end of the valid period.

In the case where the registration information shows only the beginning of the valid period, a duration from the beginning to end of the valid period may be stored in the expiration time management unit in the server apparatus, so that the expiration time management unit can calculate the end of the valid period using the beginning shown by the registration information and the stored duration.

(6) The above embodiments describe the case where the server apparatus uniformly sets an expiration time as being one month from an AD registration time, but the expiration time setting method of the present invention is not limited to such.

In more detail, the expiration time may be determined depending on a registration situation at the AD registration time. In detail, the server apparatus stores a table showing a correspondence between a number of registered devices and a duration corresponding to a valid period of a newly registered device.

As one example, the duration is three months when the number of registered devices is 0, two months when the number of registered devices is 1 or 2, one month when the number of registered devices is 3, and two weeks when the number of registered devices is 4.

When receiving a content request from a new client and setting an expiration time of the new client, the server apparatus checks the number of registered devices. In detail, the server apparatus counts the number of pieces of registration information in the registration list. The server apparatus then acquires a duration corresponding to the number of registered devices from the above table, and sets an end of the duration from the current date and time, as the expiration time of the new client.

Here, the registration situation is not limited to the number of registered devices. That is, the duration may be set depending on a registration situation other than the number of registered devices.

(7) An expiration time of a client may be extended according to a request from the client.

In detail, the expiration time can be extended if the client makes an extension request before the expiration time. A method of setting a deletion prohibition time when the expiration time of the client is extended may be any of (a) extending the deletion prohibition time by the same period as the expiration time, (b) shortening the period of the deletion prohibition time from the initial setting, such as one month in the second setting in comparison with two months in the initial setting, and (c) maintaining the deletion prohibition time regardless of whether the expiration time is extended or not.

(8) The first embodiment describes the case where when a plurality of pieces of registration reservation information are included in the registration reservation list, the server apparatus 10 registers a client having an earliest registration reservation time to the registration list first. As an alternative, registration priorities may be set.

Also, when a client shown in the registration reservation list is registered to the registration list, the client may be notified of the registration.

Also, at the time of making a registration reservation the server apparatus 10 may check an expiration time of each registered client and notify the new client how long the client needs to wait for registration. Also, the server apparatus 10 may only notify the new client how long the client needs to wait for registration, without accepting the registration reservation.

Also, having received the registration reservation from the client, the server apparatus may transmit content designated by a content request to the client, prior to registering the client to the registration list. In this case, the server apparatus transmits the content in an unusable form. In detail, the server apparatus transmits the content in an encrypted form. Subsequently, once the client has been registered in the registration list, the server apparatus transmits a key for decrypting the content to the registered client. According to this construction, content of a large data size can be transmitted when the network is not busy or when convenient for the client.

(9) A deletion prohibition time is not an essential feature of the present invention, and accordingly registration information may not include a deletion prohibition time. Whether to set the deletion prohibition time may be determined depending on a registration status of the user. As one example, whether to set the deletion prohibition time may be determined depending on a service fee paid by the user. Which is to say, no deletion prohibition time is set for a user who pays a high service fee.

Also, the deletion prohibition time may be used to secure a room in the AD for registering a device for which a deletion reservation is set. In this case, an expiration time of the device for which the deletion reservation is set may be extended when the device accesses the server apparatus within the deletion prohibition time. Also, the server apparatus may determine the deletion prohibition time depending on a service fee paid by the user, or depending on a possibility that the user may use content unauthorizedly. In detail a short deletion prohibition time may be set for a device of a user who has never used content unauthorizedly.

(10) The above embodiments describe the case where the "use" of content by a client is to copy the content to its own storage area and play back the copied content. However, the present invention is not limited to a construction in which a client immediately plays back content acquired from the server apparatus. The present invention also includes a construction in which a client holds acquired content in its own storage area and plays back the held content when the user wants to view the content.

(11) The present invention also applies to a method described above. This method may be realized by a computer program that is executed by a computer. Such a computer program may be distributed as a digital signal.

The present invention may be realized by a computer-readable storage medium, such as a flexible disk, a hard disk, a CD-ROM, an MO, a DVD, a DVD-ROM, a DVD-RAM, a BD (Blu-ray Disc), or a semiconductor memory, on which the above computer program or digital signal is recorded. Conversely, the present invention may also be realized by the computer program or digital signal that is recorded on such a storage medium.

The computer program or digital signal that achieves the present invention may also be transmitted via a network, such as an electronic communications network, a wired or wireless communications network, or an internet.

The present invention can also be realized by a computer system that includes a microprocessor and a memory. In this case, the computer program can be stored in the memory, with the microprocessor operating in accordance with this computer program.

The computer program or digital signal may be provided to an independent computer system by distributing a storage medium on which the computer program or digital signal is recorded, or by transmitting the computer program or digital signal via a network or the like. The independent computer system may then execute the computer program or digital signal to function as the present invention.

(12) The functional blocks of the server apparatus 10, the server apparatus 10*a*, the PC 20, and the PC 20*a* in the above embodiments may partially or entirely be realized by an LSI which is an integrated circuit. These may be individually realized in one chip, or partially or entirely contained in one chip. The LSI mentioned here can also be called an IC, a system LSI, a super LSI, or an ultra LSI depending on the degree of integration.

Also, the integration is not limited to the above LSI, and may be performed using a dedicated circuit or a general processor. A FPGA (Field Programmable Gate Array) that can be programmed or a reconfigurable processor capable of reconfiguring connections and settings of circuit cells in an LSI after producing the LSI may be used.

Also, if an integrated circuit technique that replaces an LSI emerges from advancement of semiconductor technology or other derivative technology, such a technique can be used for the integration of the functional blocks. For instance, biotechnology may be adapted in this way.

(13) The above embodiments and modifications may be freely combined.

The present invention can be used managerially, and recurrently and continuously, in a software industry that provides content such as a digitized work of a movie, music, and the like and software such as a computer program. Also, the device registration system, the server apparatus, and each client of the present invention can be manufactured and sold in a manufacturing industry of electronic products and the like.

The invention claimed is:

1. A device registration apparatus for registering a device as a member of a group having a limitation related to a permitted number of members, the device registration apparatus comprising:
    a clock unit operable to measure a time;
    a member storage unit operable to store registration information of a registered device already registered as a member, the registration information including identification information for identifying the registered device and a registration expiration time of the registered device;
    a reception unit operable to receive a registration request from a device to be a member;
    a selection unit operable, when the reception unit receives the registration request, to compare the time read from the clock unit with the registration expiration time included in the registration information for the registered device, and select the registration information for the registered device having the registration expiration time that is exceeded by the read time in the clock unit;
    a deletion unit operable to delete the selected registration information for the registered device from the member storage unit; and
    a registration unit operable to generate registration information that includes identification information for identifying the device and a registration expiration time of the device, and write the generated registration information to the member storage unit.

2. The device registration apparatus of claim 1, further comprising:
    a content storage unit operable to store content and a content ID for identifying the content, in correspondence with each other,
    wherein the registration request received by the reception unit from the device includes the content ID.

3. The device registration apparatus of claim 2,
    wherein the registration unit sets a time at which a predetermined period elapses from the generation of the registration information, as the registration expiration time of the device.

4. The device registration apparatus of claim 2,
    wherein the registration unit sets the registration expiration time of the device, according to a registration situation at a time of the generation of the registration information.

5. The device registration apparatus of claim 4,
    wherein a plurality of devices are already registered as members at the time of the generation of the registration information.

6. The device registration apparatus of claim 2, further comprising:
    a deletion reservation unit operable to set a deletion reservation for registration information of a registered device that satisfies a predetermined condition,
    wherein the selection unit excludes, as an option for the selection, the registration information for which the deletion reservation is set.

7. The device registration apparatus of claim 6,
    wherein the deletion reservation unit stores a deletion time corresponding to the registration information for which the deletion reservation is set, and
    the selection unit compares the time read from the clock unit with the deletion time in the deletion reservation unit, and includes, as the option for the selection, the registration information for which the deletion reservation is set if the deletion time is exceeded by the read time.

8. The device registration apparatus of claim 7,
    wherein the deletion reservation unit determines whether to set the deletion reservation, according to the predetermined condition that relates to an attribute of the device.

9. The device registration apparatus of claim 7,
    wherein the content storage unit stores a content expiration time of the content in correspondence with the content and the content ID, and
    the deletion reservation unit determines whether to set the deletion reservation, according to the predetermined condition that relates to the content expiration time corresponding to the content ID received by the reception unit.

10. The device registration apparatus of claim 1, further comprising:
    an authentication unit operable to authenticate whether the device is valid,
    wherein the registration unit generates the registration information and writes the generated registration information to the member storage unit, if the authentication unit authenticates the device as valid.

11. The device registration apparatus of claim 10,
    wherein the authentication unit stores a list of information showing an invalidated device, and authenticates whether the device is valid based on the list and the registration request.

12. The device registration apparatus of claim 1, further comprising:
    a registration reservation unit operable to hold a reservation list of reservation information showing an unregistered device, and register the unregistered device to the member storage unit if a predetermined condition is satisfied,
    wherein the selection unit instructs the registration reservation unit to make a registration reservation for the device, if no registration information in the member storage unit includes an exceeded registration expiration time, and
    the registration reservation unit generates reservation information of the device and writes the generated reservation information to the reservation list, when instructed by the selection unit.

13. The device registration apparatus of claim 12, wherein the registration reservation unit includes:
a judgment subunit operable to periodically compare the time read from the clock unit with the registration expiration time included in the registration information of the registered device, to judge whether a registration expiration time included in any registration information is exceeded by the read time;
a deletion subunit operable to delete the registration information which is judged as including the exceeded registration expiration time by the judgment subunit;
a registration subunit operable to generate registration information of the device and register the generated registration information to the member storage unit; and
an abandonment subunit operable to abandon the reservation information of the device from the reservation list, when the registration subunit registers the registration information of the device.

14. The device registration apparatus of claim 1, wherein the selection unit periodically compares the time read from the clock unit with the registration expiration time included in the registration information of the registered device, and selects the registration information including the exceeded registration expiration time.

15. The device registration apparatus of claim 1, wherein the reception unit receives, from a registered device corresponding to the selected registration information, a deletion completion notification that the registered device has completed a member withdrawal process, and
the deletion unit deletes the selected registration information when the reception unit receives the deletion completion notification.

16. The device registration apparatus of claim 1, further comprising:
a device number control unit operable to store the limitation related to the permitted number of members and a registered device number showing a number of devices already registered as members, and compare the registered device number with the limitation to exercise a control for registering the device without exceeding the limitation.

17. The device registration apparatus of claim 16, wherein the device number control unit decrements the registered device number when the deletion unit deletes registration information of one device from the member storage unit, and increments the registered device number when registration information of one device is written to the member storage unit.

18. The device registration apparatus of claim 16, wherein the registration information of the registered device in the member storage unit further includes a deletion prohibition time of the registered device, and
the selection unit further compares the time read from the clock unit with the deletion prohibition time included in the registration information of the registered device, and selects registration information including a registration expiration time and a deletion prohibition time that are both exceeded by the read time.

19. The device registration apparatus of claim 1, wherein the time measured by the clock unit is a current date and time.

20. The device registration apparatus of claim 1, wherein the time measured by the clock unit is a relative time determined by a timer or a counter.

21. The device registration apparatus of claim 1, wherein the time measured by the clock unit is protected from external tampering.

22. A device registration system for registering a device as a member of a group having a limitation related to a permitted number of members, the device comprising:
an identification information storage unit operable to store identification information for identifying the device; and
a request unit operable to generate a registration request that includes the identification information, and transmit the generated registration request to a device registration apparatus, and
the device registration apparatus comprising:
a clock unit operable to measure a time;
a member storage unit operable to store registration information of a registered device already registered as a member, the registration information including identification information for identifying the registered device and a registration expiration time of the registered device;
a reception unit operable to receive the registration request from the device to be a member;
a selection unit operable to, when the reception unit receives the registration request, compare the time read from the clock unit with the registration expiration time included in the registration information of the registered device, and select registration information for the registered device with the registration expiration time that is exceeded by the read time in the clock unit;
a deletion unit operable to delete the selected registration information for the registered device from the member storage unit; and
a registration unit operable to generate registration information that includes the identification information for identifying the device and a registration expiration time of the device, and write the generated registration information to the member storage unit.

23. A device registration method used in a device registration apparatus for registering a device as a member to a group with a limitation related to a permitted number of members, the device registration apparatus including a member storage unit operable to store registration information of a registered device already registered as a member, the registration information including identification information for identifying the registered device and a registration expiration time of the registered device, the device registration method comprising:
measuring a time;
receiving a registration request from a device to be a member;
comparing, when the registration request is received, the measured time with the registration expiration time included in the registration information of the registered device, and selecting registration information for the register device having the registration expiration time that is exceeded by the measured time; and
deleting the selected registration information for the registered device from the member storage unit; and
generating registration information that includes identification information for identifying the device and a registration expiration time of the device, and writing the generated registration information to the member storage unit.

24. A non-transitory computer-readable storage medium storing a computer program used in a device registration apparatus for registering a device as a member of a group with a limitation related to a permitted number of members, the device registration apparatus including a member storage unit operable to store registration information of a registered device already registered as a member, the registration information including identification information for identifying the registered device and a registration expiration time of the registered device, the computer program causing the device registration apparatus to perform steps comprising:

measuring a time;

receiving a registration request from a device to be a member;

comparing, when the registration request is received, the measured time with the registration expiration time included in the registration information of the registered device, and selecting registration information for the registered device having the registration expiration time that is exceeded by the measured time; and deleting the selected registration information for the registered device from the member storage unit; and generating registration information that includes identification information for identifying the device and a registration expiration time of the device, and writing the generated registration information to the member storage unit.

25. An integrated circuit for registering a device as a member of a group with a limitation related to a permitted number of members, the integrated circuit comprising:

a clock unit operable to measure a time;

a member storage unit operable to store registration information of a registered device already registered as a member, the registration information including identification information for identifying the registered device and a registration expiration time of the registered device;

a reception unit operable to receive a registration request from a device to be a member;

a selection unit operable, when the reception unit receives the registration request, to compare the time read from the clock unit with the registration expiration time included in the registration information of the registered device, and select the registration information of the registered device having the registration expiration time that is exceeded by the read time; and a deletion unit operable to delete the selected registration information for the registered device from the member storage unit; and a registration unit operable to generate registration information that include identification information for identifying the device and a registration expiration time of the device, and write the generated registration information to the member storage unit.

* * * * *